(12) United States Patent
Kim et al.

(10) Patent No.: US 12,020,498 B2
(45) Date of Patent: Jun. 25, 2024

(54) DEVICE AND METHOD FOR PROVIDING FEEDBACK FOR USER INPUT IN ELECTRONIC DEVICE

(71) Applicant: Samsung Electronics Co., Ltd., Gyeonggi-do (KR)

(72) Inventors: Hyungmin Kim, Gyeonggi-do (KR); Sanghun Kwak, Gyeonggi-do (KR); Bowon Kim, Gyeonggi-do (KR); Hyeonho Kim, Gyeonggi-do (KR); Jaemyoung Lee, Gyeonggi-do (KR); Yeonjoo Jwa, Gyeonggi-do (KR); Younghak Oh, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 17 days.

(21) Appl. No.: 17/431,938

(22) PCT Filed: Feb. 18, 2020

(86) PCT No.: PCT/KR2020/002319
§ 371 (c)(1),
(2) Date: Aug. 18, 2021

(87) PCT Pub. No.: WO2020/171543
PCT Pub. Date: Aug. 27, 2020

(65) Prior Publication Data
US 2021/0382615 A1    Dec. 9, 2021

(30) Foreign Application Priority Data
Feb. 19, 2019   (KR) ........................ 10-2019-0019487

(51) Int. Cl.
*G06V 40/13* (2022.01)
*G06F 3/04883* (2022.01)

(52) U.S. Cl.
CPC .......... *G06V 40/13* (2022.01); *G06F 3/04883* (2013.01)

(58) Field of Classification Search
CPC .... G06V 40/13; G06V 40/12; G06F 3/04883; G06F 2203/0338; G06F 1/1626;
(Continued)

(56) References Cited

U.S. PATENT DOCUMENTS 9,495,531 B2    11/2016   Fadell et al.
10,210,319 B2   2/2019    Chi et al.
(Continued)

FOREIGN PATENT DOCUMENTS

KR    10-2014-0046888 A    4/2014
KR    10-2015-0018349 A    2/2015
(Continued)

OTHER PUBLICATIONS

Korean Office Action dated Mar. 20, 2024.

*Primary Examiner* — Jonathan A Boyd
(74) *Attorney, Agent, or Firm* — Cha & Reiter, LLC

(57) ABSTRACT

An electronic device and method are disclosed. The electronic device includes a display, a touch sensor, a fingerprint recognition sensor disposed under the display, and a processor. The processor implements the method, including: detecting a user input to a fingerprint recognition region on the display that corresponds to a location of the fingerprint recognition sensor, using the touch sensor, executing fingerprint recognition on the user input using the fingerprint recognition sensor, and displaying a graphical effect on the display related to the user input while executing the fingerprint recognition.

19 Claims, 21 Drawing Sheets

(58) Field of Classification Search
CPC .. G06F 1/1643; G06F 1/1684; G06F 3/04847; G06F 3/04886; G06F 3/04895; G06F 21/32; G06F 3/0481; G06F 3/0484
See application file for complete search history.

(56) References Cited

U.S. PATENT DOCUMENTS

| | | | |
|---|---|---|---|
| 10,558,835 | B2 | 2/2020 | Kim et al. |
| 2016/0011767 | A1* | 1/2016 | Jung .................. G06V 40/1365 715/847 |
| 2016/0171281 | A1* | 6/2016 | Park ...................... G06F 1/1643 382/124 |
| 2016/0370866 | A1 | 12/2016 | Hwang et al. |
| 2018/0018795 | A1* | 1/2018 | Li ......................... G06T 11/001 |
| 2018/0074627 | A1 | 3/2018 | Kong et al. |
| 2018/0114047 | A1* | 4/2018 | Kim ..................... G06F 3/0488 |
| 2018/0260803 | A1 | 9/2018 | Seol et al. |
| 2018/0357984 | A1 | 12/2018 | Xia |
| 2018/0365477 | A1 | 12/2018 | Seol et al. |
| 2019/0080189 | A1* | 3/2019 | Van Os .................. G06F 3/016 |

FOREIGN PATENT DOCUMENTS

| | | |
|---|---|---|
| KR | 10-2016-0071887 A | 6/2016 |
| KR | 10-2016-0141566 A | 12/2016 |
| KR | 10-2018-0044129 A | 5/2018 |
| KR | 10-1901735 B1 | 9/2018 |
| WO | 2017/073811 A1 | 5/2017 |

* cited by examiner

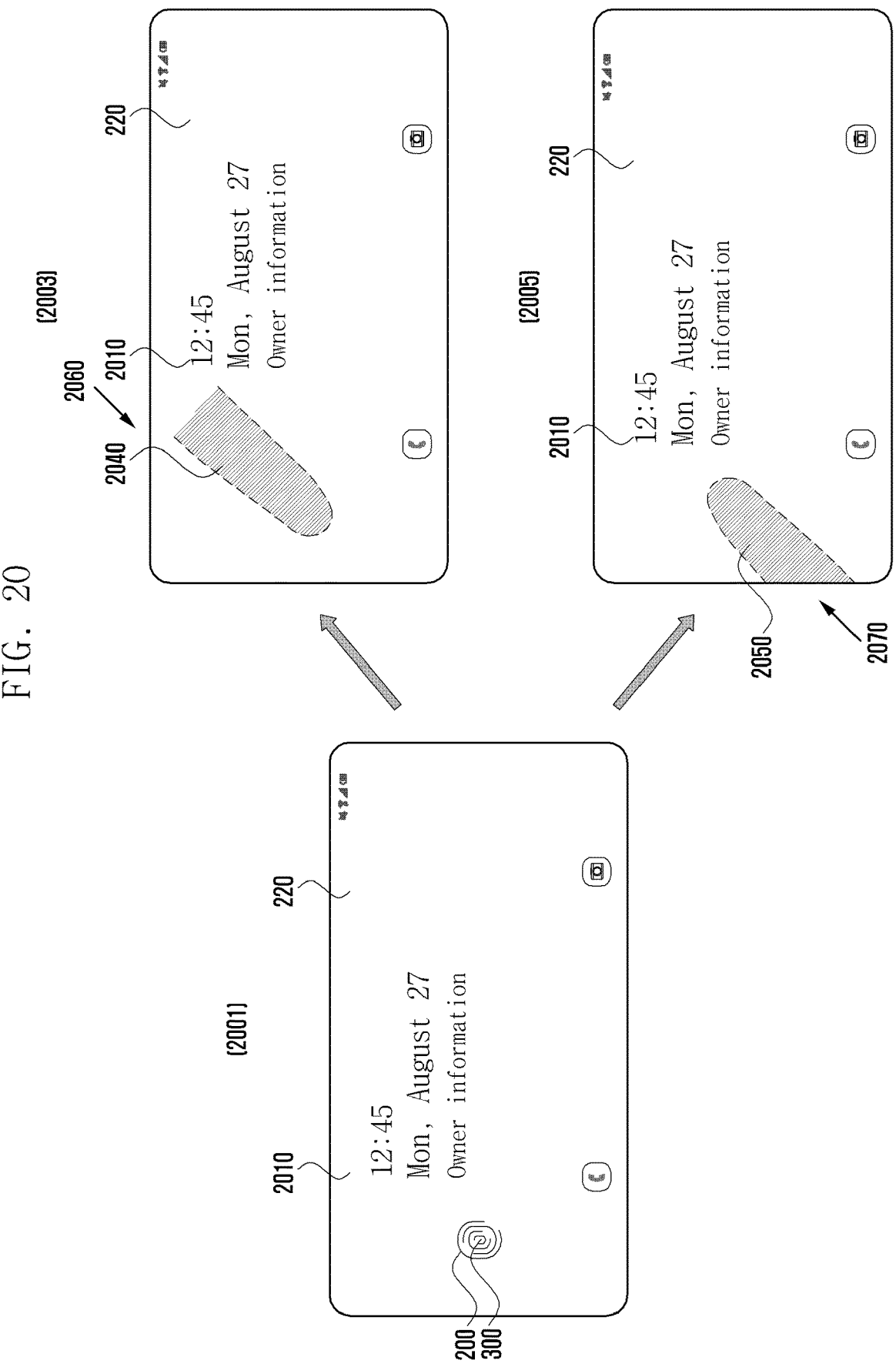

DEVICE AND METHOD FOR PROVIDING FEEDBACK FOR USER INPUT IN ELECTRONIC DEVICE

CROSS REFERENCE TO RELATED APPLICATIONS

This application is a National Phase Entry of PCT International Application No. PCT/KR2020/002319, which was filed on Feb. 18, 2020, and claims a priority to Korean Patent Application No. 10-2019-0019487, which was filed on Feb. 19, 2019, the contents of which are incorporated herein by reference.

TECHNICAL FIELD

Certain embodiments disclose an apparatus and method that provide feedback for guiding a user input (e.g., fingerprint input) in an electronic device.

BACKGROUND ART

Recently, electronic devices have advanced and developed to encompass a diversity of functions including those of traditional multimedia players, and now include composite functions such as capturing pictures or videos, playing music or video files, playing games, receiving broadcasts, or making calls. These multi-function electronic devices may include one or more displays, for displaying screens related to executing diverse applications and functions.

Because of the diversity of functions executable by these electronic devices, information related to a user's privacy and/or security may be stored in the electronic device. For example, the device may store not only contact information, call history, and/or messages, but also sensitive information such as private user information (e.g., personal information), such as locations (e.g., addresses), memos and notes, photographs, or financial transactions and accounts, etc. Accordingly, the ability of the electronic device to perform various functions in view of composite functionality may also leave it vulnerable to security issues such as exposure and leakage of the user's private information.

Recently, electronic devices have implemented security functions to protect users' private information, including user-specific authentication systems for individual electronic devices. These may include fingerprint recognition authentication. For example, fingerprint recognition authentication may be implemented in a small electronic device and is advantageous with regard to security, and thus has seen widespread implementation.

DISCLOSURE OF INVENTION

Technical Problem

An electronic device may recognize a fingerprint using a fingerprint recognition sensor (e.g., a fingerprint scan sensor or fingerprint reader). The electronic device may allow a user to input a fingerprint by embedding a fingerprint recognition sensor in a part of an electrical or mechanical input device thereof. For example, the electronic device may include a fingerprint recognition sensor embedded within a physical button (e.g., home button or home key), or other a mechanical input device disposed at the lower end of the electronic device, or alternatively, through a separate physical button disposed on the back of the electronic device, and may thus recognize a fingerprint input through the corresponding physical button. A fingerprint recognition sensor may be disposed under or within a display as well. For example, the fingerprint recognition sensor may be disposed under the display (e.g., at the bottom of the display panel or under the panel), and may recognize a fingerprint when a finger is placed in contact with (or, touched on to) the front surface of the display (e.g., display surface or screen). Accordingly, the electronic device may include a button-type fingerprint recognition sensor and/or a display fingerprint recognition sensor according to its shape.

In certain embodiments, an apparatus and method are disclosed that provide a function of fingerprint recognition on the display (e.g., fingerprint on display (FOD) or in-display fingerprint) (hereinafter referred to as "display fingerprint recognition") in an electronic device including a display fingerprint recognition sensor.

In certain embodiments, an apparatus and method are disclosed that provide a guide for user's fingerprint input when the display fingerprint recognition function is provided in the electronic device.

In certain embodiments, an apparatus and method are disclosed that provide, when the display fingerprint recognition function is provided in the electronic device, interactive feedback on the user's fingerprint input to the user based on a graphical effect on the fingerprint recognition while recognizing the user's fingerprint.

In certain embodiments, an apparatus and method are disclosed that exclude, when a graphical effect related to display fingerprint recognition is provided in the electronic device, the touch region touched according to the user's input (e.g., region that is hidden from the user's view due to the user's finger touch), and provide a graphical effect based on the remaining region.

In certain embodiments, an apparatus and method are disclosed that provide, when the display fingerprint recognition function is performed on the electronic device, a graphical object for a graphical effect based on the region from which the touch region according to the user input is excluded, or provide a graphical object included in the touch region by moving it.

Solution to Problem

An electronic device according to certain embodiments may include: a display; a touch sensor; a fingerprint recognition sensor disposed under the display; and a processor, wherein the processor may be configured to: detect a user input to a fingerprint recognition region on the display that corresponds to a location of the fingerprint recognition sensor using the touch sensor, execute fingerprint recognition on the user input using the fingerprint recognition sensor, and display a graphical effect on the display related to the user input while executing the fingerprint recognition.

An operation method of an electronic device according to certain embodiments may include: detecting a user input, based on a touch sensor, to a fingerprint recognition region on a display that corresponds to a location of a fingerprint recognition sensor disposed under the display, executing fingerprint recognition on the user input using at least one processor and the fingerprint recognition sensor, and displaying a graphical effect on the display related to the user input while executing the fingerprint recognition.

Certain embodiments of the disclosure may include a computer-readable storage medium storing a program that causes a processor to execute the above method.

Advantageous Effects of Invention

According to certain embodiments, in an electronic device and an operation method thereof, an electronic device including a fingerprint recognition sensor inside the display is provided, and a fingerprint in contact with (or touched on) the front surface of the display (e.g., display surface (or screen)) may be recognized. For example, the electronic device including a display fingerprint recognition sensor may provide a function of fingerprint recognition on the display (e.g., fingerprint on display (FOD) or in-display fingerprint) (hereinafter referred to as "display fingerprint recognition"). According to certain embodiments, when providing a display fingerprint recognition function, the electronic device may provide a guide for the user's fingerprint input.

According to certain embodiments, when a graphical effect related to display fingerprint recognition is provided in the electronic device, the touch region touched according to the user's input (e.g., region that is hidden from the user's view due to the user's finger touch) may be excluded, and the graphical effect may be provided based on the remaining region. According to certain embodiments, when the display fingerprint recognition function is provided in the electronic device, a graphical object for a graphical effect may be provided based on the region from which the touch region according to the user input is excluded, or a graphical object included in the touch region may be provided by moving it.

According to certain embodiments, when the display fingerprint recognition function is provided in the electronic device, interactive feedback on the user's fingerprint input may be provided to the user based on a graphical (or visual) effect on the fingerprint recognition while recognizing the user's fingerprint. According to certain embodiments, the electronic device may implement an optimal environment for supporting fingerprint recognition, thereby improving user convenience and improving the usability and convenience of the electronic device.

BRIEF DESCRIPTION OF DRAWINGS

FIG. 20 is a diagram illustrating an example of a user interface providing a graphical effect in the electronic device according to certain embodiments.

MODE FOR THE INVENTION

Figure 1:
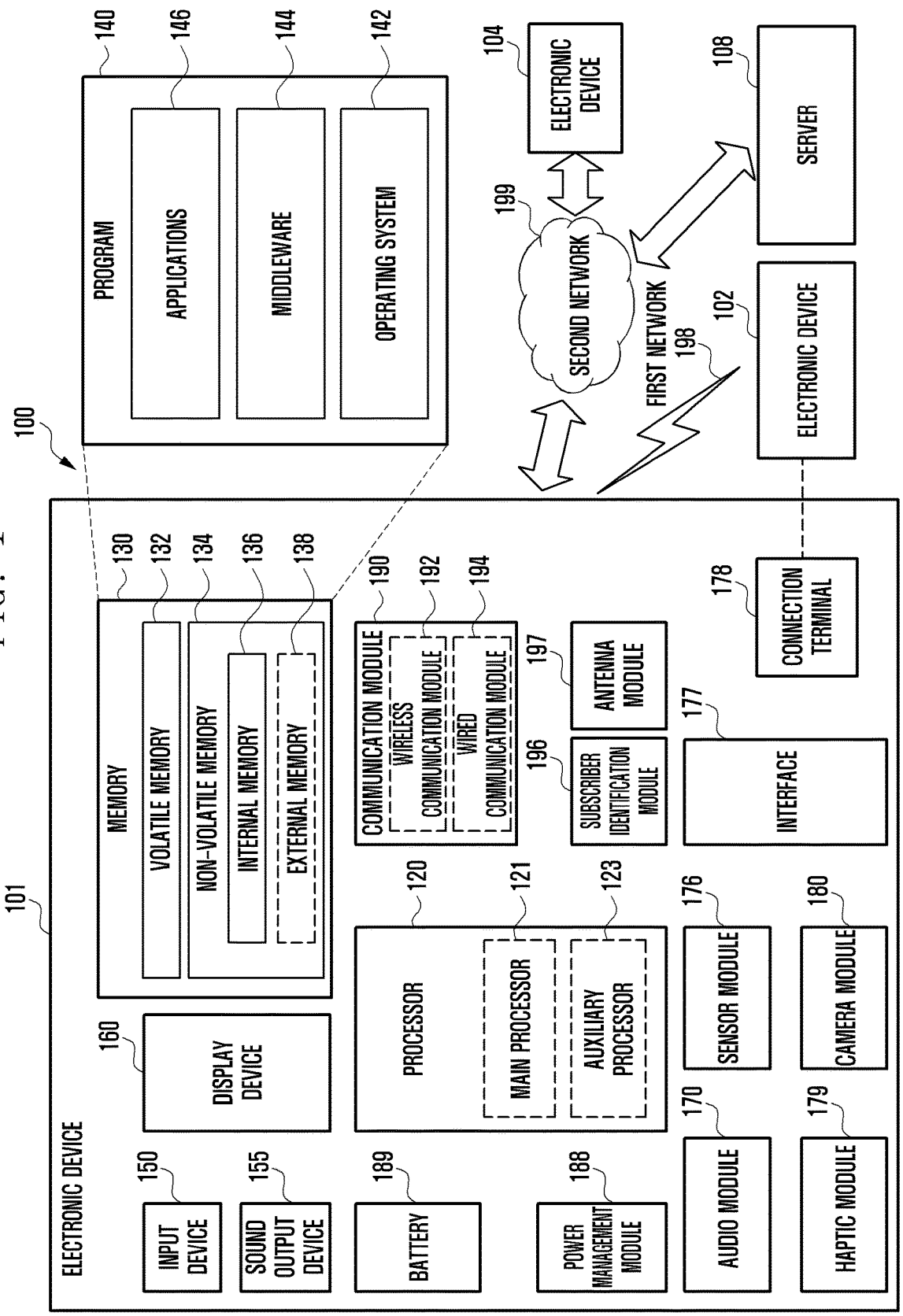
FIG. 1 illustrates an electronic device in a network environment according to an embodiment.

FIG. 1 illustrates an electronic device 101 in a network environment 100 according to an embodiment.

Referring to FIG. 1, the electronic device 101 in the network environment 100 may communicate with an electronic device 102 via a first network 198 (e.g., a short-range wireless communication network), with an electronic device 104 or a server 108 via a second network 199 (e.g., a long-range wireless communication network), or with the electronic device 104 via the server 108, and may include a processor 120, a memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) card 196, and an antenna module 197. At least one (e.g., the display device 160 or the camera module 180) of the components may be omitted from the electronic device 101, or one or more other components may be added in the electronic device 101. Some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. The processor 120 may load a command or data received from another component (e.g., the sensor module 176 or the communication module 190) in the volatile memory 132, process the command or the data stored in the volatile memory 132, and store resulting data in non-volatile memory 134. The processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). The auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101 and may include software (e.g., the program 140) and input data or output data for a command related thereto. The memory 130 may include the volatile memory 132 or the non-volatile memory 134.

The program 140 may be stored in the memory 130 as software, and may include an operating system (OS) 142, middleware 144, or an application 146.

The input device 150 may receive a command or data to be used by another component (e.g., the processor 120) of the electronic device 101, from the outside (e.g., a user) of the electronic device 101, and may include a microphone, a mouse, a keyboard, or a digital pen (e.g., a stylus pen).

The sound output device 155 may output sound signals to the outside of the electronic device 101 and may include a speaker or a receiver. The speaker may be used for general purposes, such as playing multimedia or playing record, and the receiver may be used for incoming calls and may be implemented as separate from, or as part of the speaker.

The display device 160 may visually provide information to the outside (e.g., a user) of the electronic device 101 and may include a display, a hologram device, or a projector and control circuitry to control a corresponding one of the display, hologram device, and projector. The display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa, and may obtain the sound via the input device 150, or output the sound via the sound output device 155 or a headphone of an external electronic device (e.g., an electronic device 102) directly (e.g., over wires) or wirelessly coupled with the electronic device 101.

The sensor module 176 may detect an operational state (e.g., power or temperature) of the electronic device 101 or an environmental state (e.g., a state of a user) external to the electronic device 101, and generate an electrical signal or data value corresponding to the detected state, and may include a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., over wires) or wirelessly, and may include a high-definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102), and may include a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation, and may include a motor, a piezoelectric element, or an electric stimulator.

The camera module 180 may capture a still image or moving images and may include one or more lenses, image sensors, image signal processors, or flashes.

The power management module 188 may manage power supplied to the electronic device 101, and may be implemented as at least part of a power management integrated circuit (PMIC).

The battery 189 may supply power to at least one component of the electronic device 101, and may include a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. The communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., a LAN or a wide area network (WAN)). These various types of communication modules may be implemented as a single component (e.g., a single chip), or may be implemented as multi components (e.g., multi chips) separate from each other.

The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101 and may include an antenna including a radiating element implemented using a conductive material or a conductive pattern formed in or on a substrate (e.g., a PCB). The antenna module 197 may include a plurality of antennas. In such a case, at least one antenna appropriate for a communication scheme used in the communication network, such as the first network 198 or the second network 199, may be selected by the communication module 190 (e.g., the wireless communication module 192) from the plurality of antennas. The signal or the power may then be transmitted or received between the communication module 190 and the external electronic device via the selected at least one antenna. Another component (e.g., an RFIC) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

Commands or data may be transmitted or received between the electronic device 101 and the external electronic device 104 via the server 108 coupled with the second network 199. Each of the electronic devices 102 and 104 may be a device of a same type as, or a different type, from the electronic device 101.

All or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing, as at least part of a reply to the request. To that end, a cloud, distributed, or client-server computing technology may be used, for example.

The electronic device 101 according to embodiments may be one of various types of electronic devices, such as a portable communication device (e.g., a smartphone), a computer device, a portable multimedia device, a portable medical device, a camera, a wearable device, or a home appliance. However, the electronic devices are not limited to those described above.

It should be appreciated that certain embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise.

As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., over wires), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

Before describing certain embodiments of the disclosure, a description is given of the electronic device 101 to which an embodiment of the disclosure may be applied.

Figure 2:
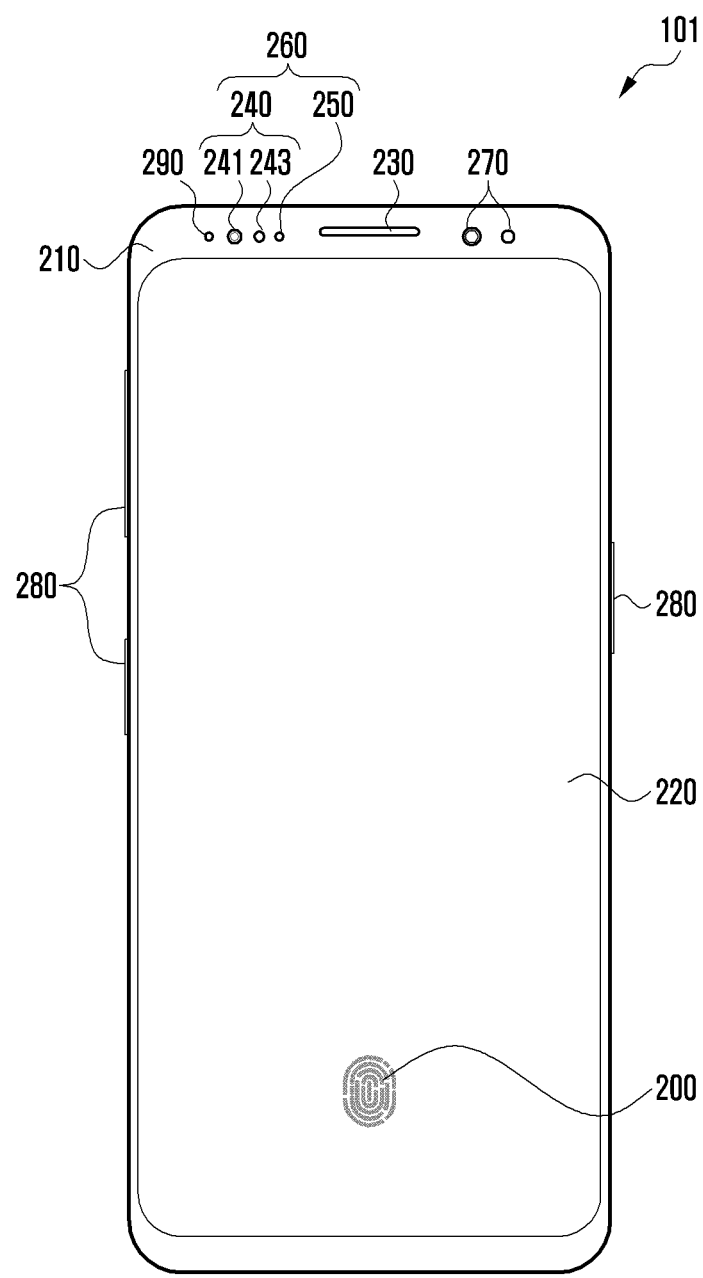
FIG. 2 is a diagram illustrating an example of an electronic device according to certain embodiments.

FIG. 2 is a diagram illustrating an example of the electronic device 101 according to certain embodiments.

With reference to FIG. 2, the electronic device 101 (e.g., electronic device 101 in FIG. 1) according to an embodiment may include a housing 210, a display 220 (e.g., display device 160 in FIG. 1), a sound output device 230 (e.g., sound output device 155 in FIG. 1), a sensor module 260 (e.g., sensor module 176 in FIG. 1), a camera module 270 (e.g., camera module 180 in FIG. 1), a key input device 280 (e.g., input device 150 in FIG. 1), an indicator 290, and a fingerprint recognition sensor 200. In a certain embodiment, at least one of the components (e.g., key input device 280 or indicator 290) may be omitted from the electronic device 101, or other components may be additionally included in the electronic device 101.

According to an embodiment, the housing 210 may refer to the outside surrounding the electronic device 101. For example, the housing 210 may include a first surface (or front surface), a second surface (or rear surface) opposite the first surface, and a side surface (e.g., side member) surrounding a space between the first surface and the second surface. According to an embodiment, the first surface may be made of a substantially transparent front plate at least in part (e.g., glass plate or polymer plate including various coating layers). According to an embodiment, the second surface may be made of a substantially opaque rear plate. In an embodiment, the rear plate may be made of, for example, coated or tinted glass, ceramic, polymer, metal (e.g., aluminum, stainless steel (STS), or magnesium), or a combination of at least two thereof. According to an embodiment, the side surface is coupled to the front plate and the rear plate, and may be formed of a side bezel structure (or side member) including a metal and/or a polymer.

According to an embodiment, the display 220 may be disposed on, for example, the first surface (e.g., front plate) of the housing 210 to be exposed to the outside. The display 220 may be disposed in combination with or adjacent to a touch sensing circuit (or touch sensor), a pressure sensor capable of measuring the intensity (pressure) of a touch, and/or a digitizer detecting a magnetic field type stylus pen. According to an embodiment, the display 220 may be implemented in various forms, such as liquid crystal display (LCD) or organic light emitting diodes (OLED). Based on the control of the processor (e.g., processor 120 in FIG. 1), the display 220 may display various images (e.g., moving images and/or still images) and may receive input from various external objects (e.g., human hand) on the display 220. The display 220 may include a touch sensor (not shown) to receive input by various external objects.

According to an embodiment, the touch sensor may be configured as an independent layer from the display panel of the display 220 or may be implemented as an integrated structure together with the display panel. The touch sensor may receive a contact touch input being a touch realized when an external object directly contacts the display 220, or a proximity input being a touch realized when an external object is in proximity to the display 220 (e.g., hovering) without a direct contact.

In a certain embodiment, at least a portion of the sensor module 260 and/or at least a portion of the key input device 280 may be disposed in the region of the display 220.

According to an embodiment, the sound output device 230 may include speakers. The speakers may include an external speaker (not shown) and a receiver 230 for a call. In a certain embodiment, the microphone, speakers, and connectors (not shown) may be disposed in a space formed by the housing 210 of the electronic device 101 and exposed to the outside through at least one hole (or opening) formed in the housing 210.

According to an embodiment, the sensor module 260 may generate an electrical signal or data value corresponding to an internal operating state of the electronic device 101 or an external environmental state. The sensor module 260 may include, for example, a first sensor module 240 (e.g., proximity sensor) and/or a second sensor module 250 (e.g., illuminance sensor) disposed on the first surface of the housing 210, and a third sensor module (not shown) (e.g., heart rate measurement (HRM) sensor) disposed on the second surface of the housing 210. According to an embodiment, the first sensor module 240 (e.g., proximity sensor) may detect an external object in proximity to the electronic device 101. The first sensor module 240 may include a light emitting unit 241 emitting infrared light and a light receiving unit 243 receiving infrared light reflected by an external object. According to an embodiment, the second sensor module 250 (e.g., illuminance sensor) may measure illumination in an ambient (or surrounding) area of the electronic device 101.

According to an embodiment, the camera module 270 may include a first camera device disposed on the first surface of the electronic device 101, and/or a second camera device (not shown) and/or a flash (not shown) disposed on the second surface. The camera module 270 may include one or more lenses, an image sensor, and/or an image signal processor. The flash may include, for example, a light emitting diode (LED) or a xenon lamp. In a certain embodiment, two or more lenses (e.g., wide-angle and telephoto lenses) and image sensors may be disposed on one surface of the electronic device 101.

According to an embodiment, the key input device 280 may be disposed on a side surface of the housing 210. In another embodiment, the electronic device 101 may not include some or all of the key input devices 280; those key input devices 280 being not included may be implemented in another form such as a soft key on the display 220. In another embodiment, the key input device 280 may be implemented by using a touch sensor and/or a pressure sensor included in the display 220.

According to an embodiment, the indicator 290 may be disposed, for example, on the first surface of the housing 210. The indicator 290 may provide, for example, state information of the electronic device 101 in the form of light. For example, the indicator 290 may serve as an LED pilot lamp (or indicating lamp). In another embodiment, the indicator 290 may provide a light source interworking with, for example, the operation of the camera module 270. The indicator 290 may include, for example, a light emitting element (or semiconductor) such as an LED, an infrared (IR) LED, and a xenon lamp.

Although not shown, the electronic device 101 may include an input device (not shown) and/or a connector hole (not shown). The input device may include a plurality of microphones arranged to detect the direction of a sound. The connector hole may include a first connector hole capable of accommodating a connector (e.g., USB connector) for transmitting and receiving power and/or data to and from an external electronic device, and/or a second connector hole (or, earphone jack) capable of accommodating a connector for transmitting and receiving an audio signal to and from an external electronic device.

According to an embodiment, the electronic device 101 may further include a sensor module not shown (e.g., sensor module 176 in FIG. 1), for example, at least one of a gesture sensor, a gyro sensor, a barometric pressure sensor, a magnetic sensor, an acceleration sensor, a grip sensor, a color sensor, an IR sensor, a biometric sensor, a temperature sensor, or a humidity sensor.

According to certain embodiments, the display 220 of the electronic device 101 may be implemented in a design in which the area occupying the first surface is increased (e.g., bezel-less display), and various components disposed on the first surface (e.g., first sensor module 240 and/or second sensor module 250) may be disposed between the display 220 and the second surface or within the display 220. For example, the proximity sensor and/or the illuminance sensor may be disposed as an under-display sensor structure between the display 220 and the second surface (or, at the lower portion of the display 220 (e.g., under panel)). As another example, the proximity sensor and/or the illuminance sensor may be formed inside the display 220 by being integrally formed with the display 220 in an in-display sensor structure (e.g., on cell touch AMOLED (OCTA) structure).

According to certain embodiments, the electronic device 101 may provide a function of fingerprint recognition on the display 220 (e.g., fingerprint on display (FOD) or in-display fingerprint) (hereinafter, referred to as "display fingerprint recognition"). For example, as illustrated in FIG. 2, the electronic device 101 may include a fingerprint recognition sensor 200 (e.g., display fingerprint recognition sensor) at a portion between the display 220 and the second surface (or, lower portion of the display 220 (e.g., under panel)) (or, space formed by the housing 210). For example, the fingerprint recognition sensor 200 may be disposed, in an under-display sensor structure, at a portion between the display 220 placed on the front surface (e.g., first surface) of the electronic device 101 and the second surface (or, at the lower portion of the display 220 (e.g., under panel)). As another example, the fingerprint recognition sensor 200 may be formed inside the display 220 by being integrally formed with the display 220 in an in-display sensor structure (e.g., OCTA structure).

In a certain embodiment (not shown), the fingerprint recognition sensor 200 may be disposed on a separate button (e.g., physical home button) at the lower end of the display 220 placed on the first surface of the housing 210 and/or on a separate button in some region of the second surface. In a certain embodiment (not shown), the electronic device 101 may be implemented to further include a fingerprint recognition sensor in the form of a button together with the display fingerprint recognition sensor. In a certain embodiment (not shown), the fingerprint recognition sensor 200 may be implemented with a full-area fingerprint recognition sensor configured to have an area corresponding to the entire surface (e.g., full area) of the display 220 (e.g., capable of supporting fingerprint recognition through the entire surface of the display 220).

According to an embodiment, the electronic device 101 may provide display fingerprint recognition based on the fingerprint recognition sensor 200. In an embodiment, the display fingerprint recognition may be implemented such that the fingerprint recognition sensor 200 is disposed under the display 220 (e.g., under panel), so that the fingerprint recognition sensor 200 is not exposed to the outside. For example, the electronic device 101 may embed the fingerprint recognition sensor 200 under the display (e.g., lower part of the display panel), and may recognize a fingerprint in contact with (or, touched on) the front surface of the display (e.g., display surface (or screen)).

According to an embodiment, the fingerprint recognition sensor 200 may have a configuration corresponding to an optical method, an ultrasonic method, and/or a capacitive method (or semiconductor method). The optical method may be a method of acquiring a fingerprint image (or image) reflected by visible light. The ultrasound method may be a method of acquiring a fingerprint image by using an ultrasound examination principle. The capacitive method may be a method of acquiring a fingerprint image by using a difference in capacitance. For example, the optical method may be a method of illuminating the platen with light and recognizing a reflected fingerprint image according to the shape of a fingertip placed on the platen. For example, the semiconductor method may be a method using electrical conduction characteristics of the skin, which reads the special shape of the fingerprint in contact with the chip surface as an electrical signal when a fingertip is in direct contact with the chip surface, and may be a method using biological characteristics. According to an embodiment, the fingerprint recognition sensor 200 may be configured as a touch sensor type. The touch sensor may arrange electrodes at intervals smaller than the size and interval of valleys and ridges of the fingerprint.

According to an embodiment, the fingerprint recognition sensor 200 may be implemented as a swipe type or a fixed area type. For example, the swipe type is a method of dragging a finger at the location of the fingerprint recognition sensor 200, where the dragged finger (i.e., fingerprint) can be sequentially recognized by one-dimensionally or linearly arranged sensor electrodes and then a two-dimensional fingerprint image can be synthesized through post-processing. For example, the fixed area type may be a method of obtaining a two-dimensional fingerprint image while a finger is being placed on the sensor arranged in two dimensions. According to an embodiment, in the touch sensor for recognizing a fingerprint, electrodes may be disposed in one dimension or two dimensions.

According to certain embodiments of the disclosure, to guide the fingerprint input position (or, position where the fingerprint recognition sensor 200 is disposed) of the fingerprint recognition sensor 200 (e.g., display fingerprint recognition sensor), the display 220 may provide (or display) an indicating object (e.g., fingerprint image object and/or guide text) through a corresponding region in which the fingerprint recognition sensor 200 is disposed on the display 220. For example, in a situation where fingerprint input is requested, the processor 120 may display an indicating object based on a region for guiding fingerprint input to the user (e.g., region in which the fingerprint recognition sensor 200 is disposed). According to an embodiment, when providing the indicating object, the processor 120 may activate a function of receiving a touch input in the region where the fingerprint recognition sensor 200 is disposed and the surrounding region thereof on the display 220, and/or may deactivate the touch input reception function in the remaining region except for the region for activating the touch input function (e.g., region where the fingerprint recognition sensor 200 is disposed and the surrounding region thereof).

Figure 3A:
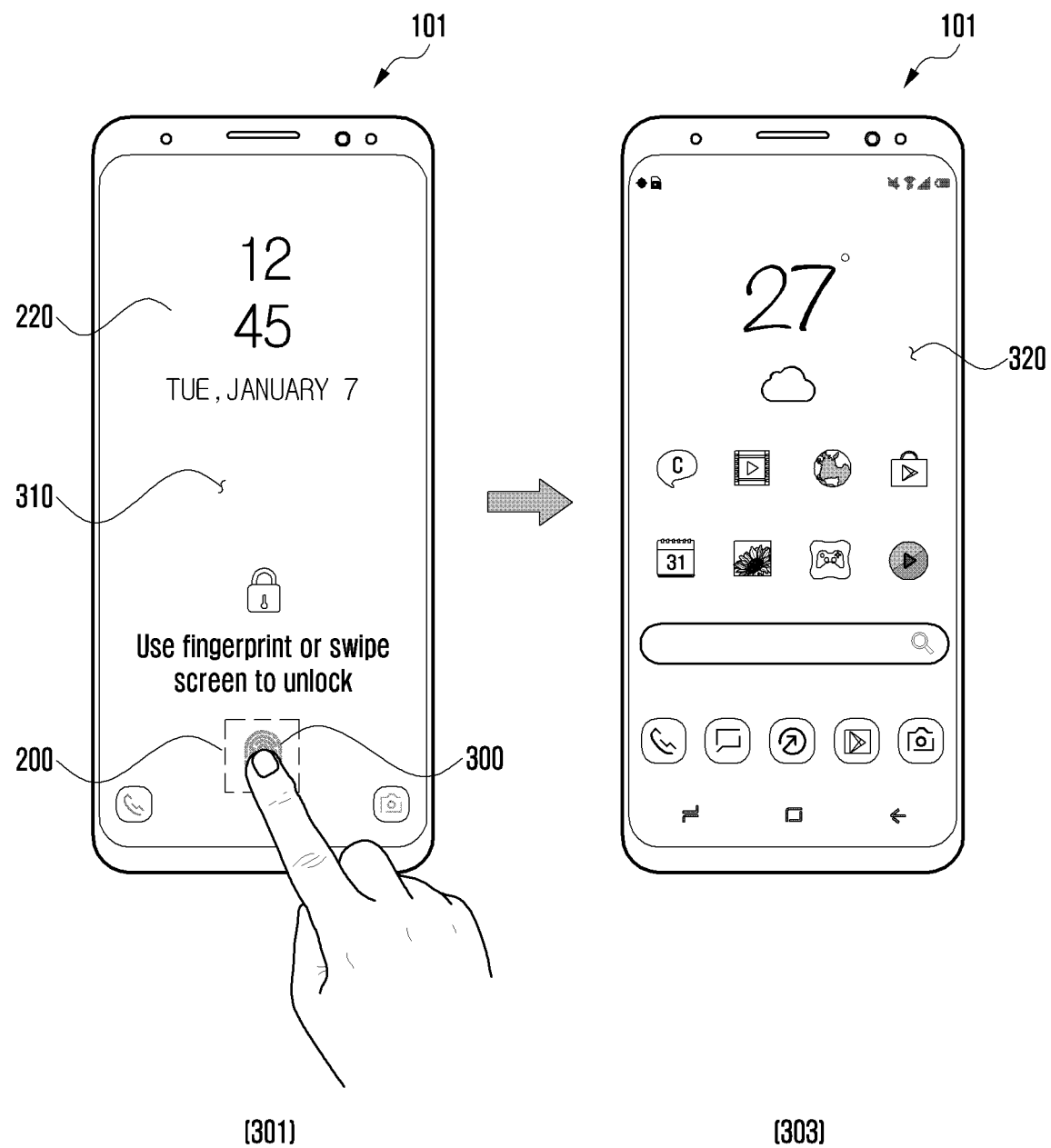
FIGS. 3A and 3B are diagrams illustrating examples of a usage scenario of a fingerprint recognition sensor in the electronic device 101 according to certain embodiments.
Figure 3B:
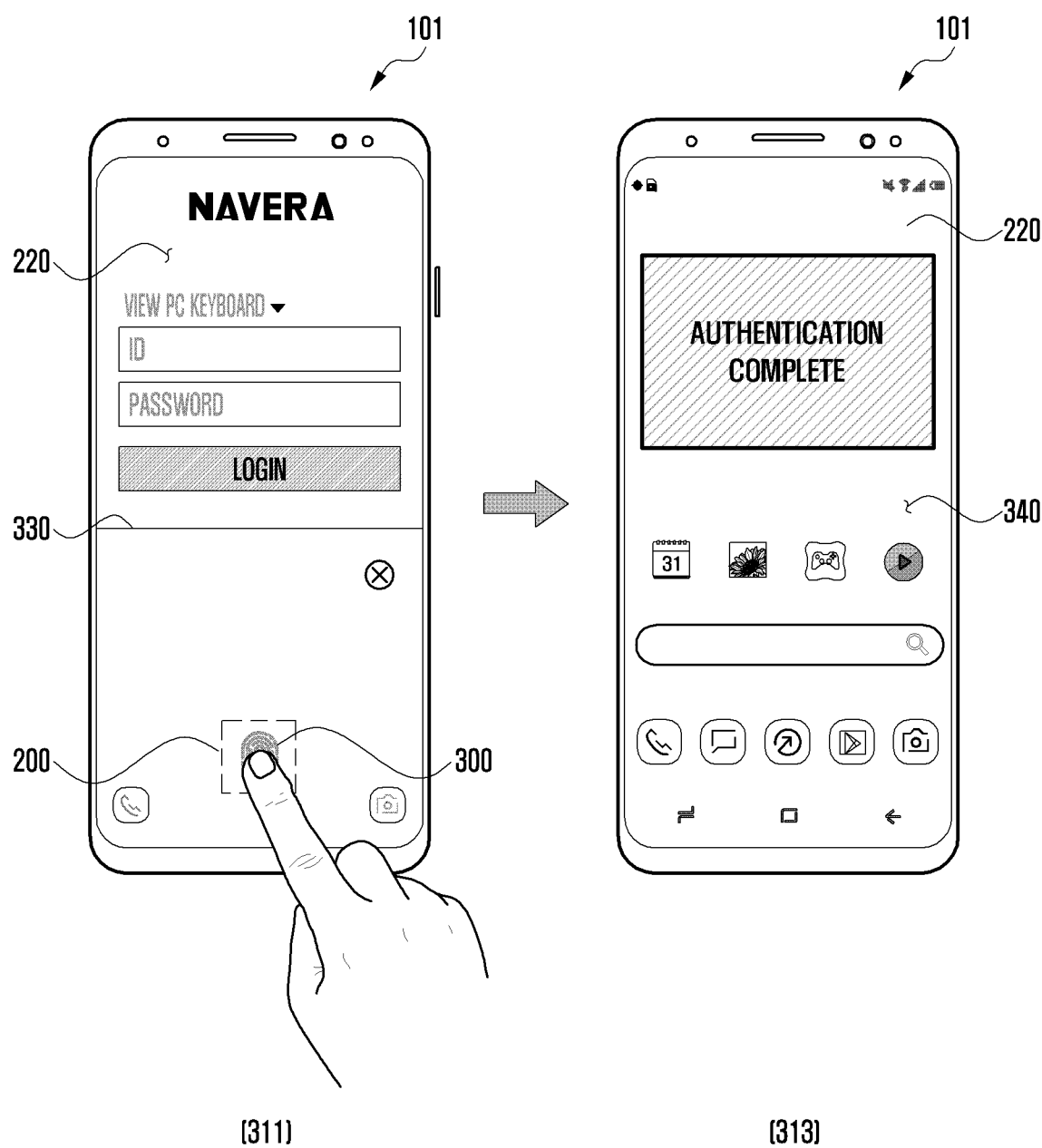

FIGS. 3A and 3B are diagrams illustrating examples of a usage scenario of the fingerprint recognition sensor in the electronic device 101 according to certain embodiments of the disclosure.

With reference to FIG. 3A, FIG. 3A may show an example of an operation when the user attempts to unlock (e.g., user authentication) through fingerprint recognition on the lock screen. In FIG. 3A, the fingerprint recognition region, that is, the fingerprint recognition sensor 200 may be embedded in the display 220.

According to an embodiment, when the user performs user authentication based on fingerprint authentication (e.g., fingerprint mode), as shown by operation 301, an indicating object 300 (e.g., a fingerprint image object and/or guide text object) for prompting (or guiding) input of a fingerprint for authentication and recognition may be provided in a region (e.g., region in which the fingerprint recognition sensor 220 is disposed) on the lock screen 310 being displayed. According to an embodiment, the user may perform fingerprint recognition by touching a finger to the indicating object 300 on the screen 310 (e.g., lock screen) on which the indicating object 300 for fingerprint recognition is displayed, through the display 220 of the electronic device 101. In an embodiment, fingerprint recognition may be performed based on a swipe type or a fixed area type in the fingerprint recognition region corresponding to the indicating object 300. In an embodiment, fingerprint recognition on the display 220 may be performed when a long touch is made on the fingerprint recognition region of the display 220 (e.g., on the region of the indicating object 300).

According to an embodiment, when a touch input is detected (e.g., detection of a measurement value provided from the touch sensor) through the fingerprint recognition region corresponding to the indicating object 300, the electronic device 101 may obtain a fingerprint image through the fingerprint recognition sensor 200 and analyze the obtained fingerprint image.

According to an embodiment, upon determining that the fingerprint image is a complete image (e.g., fingerprint image when the user fully performs fingerprint recognition through the fingerprint recognition sensor 200), and properly authenticated according to a fingerprint image analysis result, as shown by operation 303, the electronic device 101 may process an operation related to unlocking the lock screen through fingerprint recognition. For example, the electronic device 101 may perform authentication based on the fingerprint image obtained through the fingerprint recognition sensor 200, and may display a screen 320 (e.g., home screen or application execution screen) from which the lock screen is released based on the authentication result (e.g., successful authentication) according to fingerprint recognition. According to an embodiment, the indicating object 300 may be displayed, for example, while the fingerprint mode (or, fingerprint recognition function) is activated, and may be not displayed while the fingerprint mode is deactivated.

With reference to FIG. 3B, FIG. 3B may show an example of an operation when the user attempts to perform account authentication (e.g., log-in) at a specific website through fingerprint recognition. FIG. 3B may be a case in which the fingerprint recognition region, that is, the fingerprint recognition sensor 200 is embedded in the display 220.

According to an embodiment, when the user performs account authentication using fingerprint authentication (e.g., fingerprint mode), as shown by operation 311, an indicating object 300 (e.g., fingerprint image object and/or guide text object) for prompting (or guiding) input of a fingerprint for authentication and recognition may be provided in a region (e.g., region in which the fingerprint recognition sensor 220 is disposed) on the website screen 330 being displayed. According to an embodiment, the user may perform fingerprint recognition through the display 220 of the electronic device 101 by touching a finger on the indicating object 300 on the screen 330 (e.g., login screen) on which the indicating object 300 for fingerprint recognition is displayed. In an embodiment, fingerprint recognition may be performed based on a swipe type or a fixed area type in the fingerprint recognition region corresponding to the indicating object 300. In an embodiment, fingerprint recognition on the display 220 may be performed when a long touch is made on the fingerprint recognition region (e.g., on the region of the indicating object 300) of the display 220.

According to an embodiment, when a touch input is detected (e.g., detection of a measurement value provided from the touch sensor) through the fingerprint recognition region corresponding to the indicating object 300, the electronic device 101 may obtain a fingerprint image through the fingerprint recognition sensor 200 and analyze the obtained fingerprint image.

According to an embodiment, upon determining that the fingerprint image is a complete image (e.g., fingerprint image when the user fully performs fingerprint recognition through the fingerprint recognition sensor 200), and the fingerprint is properly authenticated based on the fingerprint image analysis result, as shown by operation 313, the electronic device 101 may process an operation related to performing account authentication (login) on the website through fingerprint recognition. For example, the electronic device 101 may perform authentication based on the fingerprint image obtained through the fingerprint recognition sensor 200, display a related guide screen 340 based on the authentication result according to fingerprint recognition, and log on to the website when authentication is successful. According to an embodiment, the indicating object 300 may be displayed, for example, while the fingerprint mode (or, fingerprint recognition function) is activated, and may be not displayed while the fingerprint mode is deactivated.

According to certain embodiments, in the following description, a fingerprint mode or a fingerprint recognition mode may be used as a term including a fingerprint registration mode and a fingerprint input mode. According to an embodiment, the fingerprint registration mode may be a mode in which a fingerprint is initially registered in the electronic device 101. According to an embodiment, the fingerprint input mode is a mode in which a fingerprint is input to perform a specific function (e.g., unlock function or fingerprint-based user authentication) in a state where a fingerprint has been registered, and the electronic device 101 may compare the input fingerprint with the registered fingerprint and perform a corresponding function according to whether there is a match.

Figure 4:
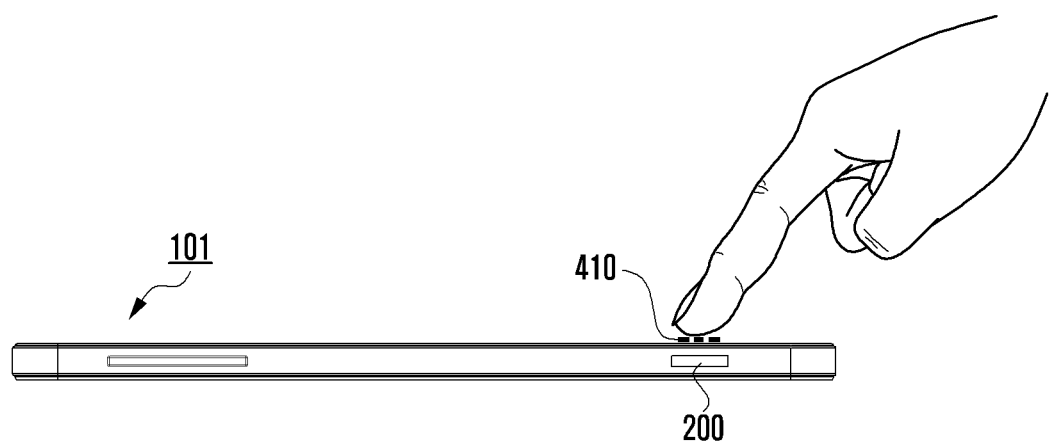
FIGS. 4 and 5 are diagrams illustrating examples of a finger touch for fingerprint recognition in the electronic device according to certain embodiments.
Figure 5:
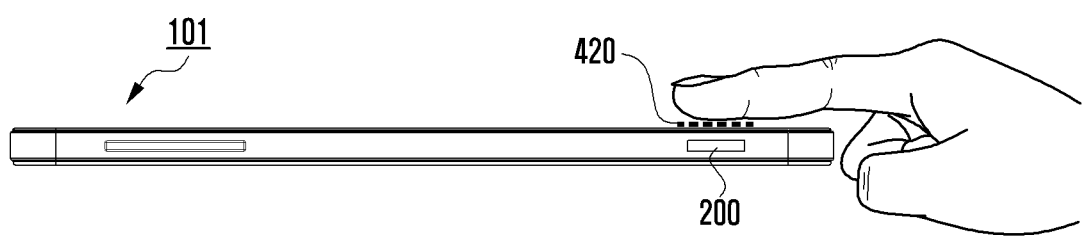

FIGS. 4 and 5 are diagrams for explaining an example of a finger touch for fingerprint recognition in the electronic device 101 according to certain embodiments of the disclosure.

With reference to FIGS. 4 and 5, FIG. 4 shows an example of scanning a fingerprint with a fingertip, and FIG. 5 shows an example of scanning a fingerprint with an entire finger.

According to an embodiment, for fingerprint recognition, the user may perform a fingerprint input using a touch method as shown in FIG. 4 or FIG. 5. According to an embodiment, when scanning a finger to recognize a user's fingerprint, the electronic device 101 may perform a scan based on a fingertip 410 (e.g., finger edge portion) (e.g., touch input with a relatively small area) according to a user input (or touch input) as illustrated in FIG. 4, or may perform a scan with a finger area 420 (e.g., touch input with a relatively large area) according to a user input (or touch input) as illustrated in FIG. 5. According to an embodiment, the user may perform fingerprint input in a swipe type by entering a finger into the region where the fingerprint recognition sensor 200 is located from a certain direction (e.g., entering from a lower portion of the electronic device 101, or entering from a side of the electronic device 101) and swiping the region where the fingerprint recognition sensor 200 is located, or perform fingerprint input in a fixed area type by placing a finger on the region where the fingerprint recognition sensor 200 is located for a preset period of time.

In certain embodiments, while waiting for fingerprint recognition based on the fingerprint recognition sensor 200, the electronic device 101 may not operate with respect to a touch input by the touch sensor. For example, while performing fingerprint sensing in response to a touch input entered by the user on the region where the fingerprint recognition sensor 200 is located, the electronic device 101 may not perform an operation (or function) related to a touch input.

Figure 6:
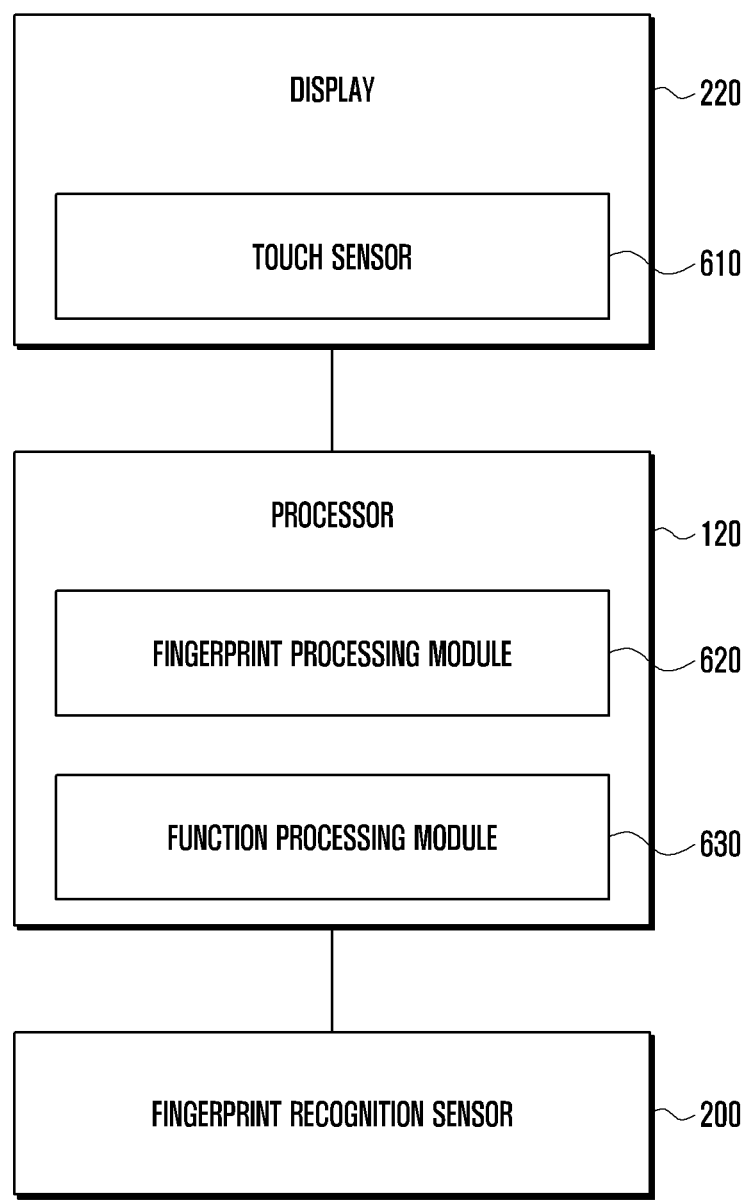
FIG. 6 is a diagram schematically illustrating a configuration of the electronic device 101 according to certain embodiments.

FIG. 6 is a diagram schematically illustrating a configuration of the electronic device 101 according to certain embodiments of the disclosure.

With reference to FIG. 6, the electronic device 101 according to an embodiment may include a display 220, a fingerprint recognition sensor 200, and a processor 120. According to an embodiment, the electronic device 101 may be implemented in a form in which the fingerprint recognition sensor 200 modularized as an integrated circuit (IC) and the processor 120 are mounted on a printed circuit board.

According to an embodiment, the display 220 (e.g., display device 160 in FIG. 1) may visually provide information to the outside (e.g., user) of the electronic device 101. According to an embodiment, the display 220 may include a touch sensor 610 (or touch circuitry) configured to sense a touch, or a pressure sensor (or sensor circuitry) configured to measure the intensity of a force generated by a touch.

According to an embodiment, the touch sensor 610 may detect a touch input or a hovering input by measuring a change in a signal (e.g., voltage, light amount, resistance, or charge amount) for a specific position on the display 220. The touch sensor 610 may provide information (e.g., location, area, pressure, or time) regarding the detected touch input or hovering input to the processor 120. For example, based on the control of the processor 120, the display 220 may include a display function for displaying various screens, and a function for receiving a touch input by receiving an input from an external object on the display 220. According to an embodiment, the display 220 may internally embed a fingerprint recognition sensor 200.

According to an embodiment, the fingerprint recognition sensor 200 may be a sensor for recognizing a user's fingerprint. The fingerprint recognition sensor 200 may be disposed between the display 220 and the second surface of the housing 210 (or, lower portion of the display 220 (e.g., under panel)) or at a portion inside the display 220. The fingerprint recognition sensor 200 may be mounted inside the display 220 to recognize a fingerprint input from the user. According to an embodiment, the fingerprint recognition sensor 200 may obtain image information (or fingerprint information) of a finger fingerprint indicating a difference in characteristics unique to the user. In an embodiment, the fingerprint recognition sensor 200 may obtain a fingerprint image in various ways, such as an optical method, a semiconductor element method that detects capacitance or electrical conduction, an ultrasonic method, a heat detection method, a non-contact method, or a combination thereof.

According to an embodiment, the processor 120 may control the operation of the electronic device 101. According to an embodiment, the processor 120 may control an operation related to performing a function according to fingerprint recognition. According to an embodiment, the processor 120 may be operably and/or electrically connected to the display 220 and the fingerprint recognition sensor 200, and may control the display 220 and the fingerprint recognition sensor 200. According to an embodiment, the processor 120 may be implemented with one or more processors that execute one or more programs (or instructions) stored in the memory (e.g., memory 130 in FIG. 1) to control the operation of the electronic device 101 in certain embodiments. According to an embodiment, the processor 120 may include at least one of an application processor (AP), a communication processor (CP), and/or a supplementary processor.

According to an embodiment, the processor 120 may process information input from the fingerprint recognition region corresponding to a location of the fingerprint recognition sensor 200 mounted on the display 220 in accordance with a specified criterion, check the validity of a fingerprint image obtained through the fingerprint recognition sensor 220, and transmit the result to the display 220 and control it for display.

According to an embodiment, the processor 120 may detect an occurrence of an event related to fingerprint recognition, and may control (e.g., activation/deactivation control, function control) at least one of the display 220, the touch sensor 610, and/or the fingerprint recognition sensor 200 in response to an event occurrence. For example, in a mode related to fingerprint recognition (e.g., fingerprint recognition mode), the processor 120 may detect a touch input related to the fingerprint recognition region in which the fingerprint recognition sensor 200 is located from the touch sensor 610 and activate the fingerprint recognition sensor 200 based on the touch input.

According to certain embodiments, when detecting an occurrence of an event, the processor 120 may control the display 220 to display a screen related to the event occurrence. For example, the screen related to an event occurrence may include various screens including an indicator (or, indicating object 300) or information related to the event. According to an embodiment, the display 220 may activate the input reception function for receiving a touch input or a proximity input while displaying a screen related to an event occurrence.

According to an embodiment, the processor 120 may control an operation related to providing the function of fingerprint recognition on the display 220 (e.g., fingerprint on display (FOD) or in-display fingerprint) (hereinafter referred to as "display fingerprint recognition"). According to an embodiment, the processor 120 may activate the touch sensor 610 and the fingerprint recognition sensor 200 in response to an event occurrence, and may identify a touch region touched by the user in the region where the fingerprint recognition sensor 200 is disposed based on the touch sensor 610.

According to an embodiment, the processor 120 may control the display 220 to display a graphical object related to fingerprint recognition based on the touch region. For example, when providing the display fingerprint recognition function, the processor 120 may guide the user's fingerprint input based on the indicating object, and may provide the user with interactive feedback on the user's fingerprint input based on a graphical effect about fingerprint recognition while recognizing the user's fingerprint.

According to an embodiment, when providing a graphical effect related to display fingerprint recognition, the processor 120 may exclude the touch region touched according to a user input and provide a graphical effect based on the remaining region. In certain embodiments, the touch region may be, for example, at least a partial region of the display 220 that is hidden from the user's view due to the user's finger touch on the display 220. According to certain embodiments, when performing the display fingerprint recognition function, the processor 120 may provide a graphical object for a graphical effect based on the region from which the touch region according to a user input is excluded, or may provide a graphical object included in the touch region by moving it. A description will be given of operations of the processor 120 according to certain embodiments with reference to the drawings described later.

According to an embodiment, the processor 120 may include a fingerprint processing module 620 and a function processing module 630.

In an embodiment, the fingerprint processing module 620 may obtain a fingerprint image from the fingerprint recognition sensor 200 and analyze the obtained fingerprint image. According to an embodiment, the fingerprint processing module 620 may extract features of the raw fingerprint image obtained through the fingerprint recognition sensor 200, and may compare and match them with the user's characteristic information (e.g., fingerprint information) preregistered in a database (e.g., memory 130 in FIG. 1) to determine the identity of the user (or authentication).

In an embodiment, the function processing module 630 may operate to process a graphical effect when a fingerprint recognition function is performed based on the fingerprint recognition sensor 200. According to an embodiment, the function processing module 630 may display a graphical object related to fingerprint recognition based on the touch region. For example, when providing the display fingerprint recognition function, the function processing module 630 may guide the user's fingerprint input based on the indicating object, and may provide the user with interactive feedback on the user's fingerprint input based on a graphical effect about fingerprint recognition while recognizing the user's fingerprint.

In an embodiment, when providing a graphical effect related to display fingerprint recognition, the function processing module 630 may exclude the touch region touched according to a user input (e.g., region that is hidden from the user's view due to the user's finger touch) and provide a graphical effect based on the remaining region. For example, when performing the display fingerprint recognition function, the function processing module 630 may provide a graphical object for a graphical effect based on the region from which the touch region according to a user input is excluded, or may provide a graphical object included in the touch region by moving it.

In certain embodiments, a fingerprint mode or a fingerprint recognition mode may be used as a term including a fingerprint registration mode and a fingerprint input mode. According to an embodiment, the fingerprint registration mode may be a mode in which a fingerprint is initially registered in the electronic device 101. According to an embodiment, the fingerprint input mode is a mode in which a fingerprint is input to perform a specific function (e.g., unlock function or fingerprint-based user authentication) in a state where a fingerprint has been registered, and the processor 120 (or, function processing module 630) may compare the input fingerprint with the registered fingerprint and perform a corresponding function according to whether there is a match.

In certain embodiments, the processor 120 may control various operations related to the normal functions of the electronic device 101 in addition to the above functions. For example, when a specific application is executed, the processor 120 may control its operation and screen display. As another example, the processor 120 may receive input signals corresponding to various touch or proximity event inputs supported by a touch-based or proximity-based input interface (e.g., touch sensor 610) and control function operations accordingly.

Certain embodiments described in the disclosure may be implemented in a storage medium readable by a computer or a similar device by using software, hardware, or a combination thereof. For hardware implementation, operations described in certain embodiments may be implemented by using at least one of application specific integrated circuits (ASICs), digital signal processors (DSPs), digital signal processing devices (DSPDs), programmable logic device (PLDs), field programmable gate array (FPGAs), processors, controllers, micro-controllers, microprocessors, and electrical units for performing other functions.

In certain embodiments, the storage medium may include a computer-readable storage medium storing a program carrying out operations that, when providing a display fingerprint recognition function, provide a visual effect (graphical effect) for fingerprint recognition through the display 220 while recognizing a fingerprint, such that when providing the visual effect, the touch region touched by the user is excluded from a specified effect region and the visual effect is provided based on the remaining non-touch region.

An electronic device 101 according to certain embodiments of the disclosure may include a display 220, a touch sensor 610, a fingerprint recognition sensor 200 disposed under the display 220, and a processor, such that the processor 120 may be configured to detect a user input in a fingerprint recognition region including the fingerprint recognition sensor 200 on the display 220 based on the touch sensor 610, perform fingerprint recognition according to the user input based on the fingerprint recognition sensor 200, and provide a graphical effect related to the user input while performing fingerprint recognition.

According to certain embodiments of the disclosure, the processor 120 may be configured to detect an occurrence of an event for entering a fingerprint recognition mode, and display an indicating object 300 related to fingerprint input at a position corresponding to a location of the fingerprint recognition region on the display 220 based on the occurrence of the event.

According to certain embodiments of the disclosure, the processor 120 may be configured to provide the graphical effect interacting with the user input based on the remaining non-touch region excluding the touch region touched by the user input from the effect region designated on the display 220.

According to certain embodiments of the disclosure, the processor 120 may be configured to provide the graphical effect based at least on movement of a designated graphical object and/or an object included in the touch region.

According to certain embodiments of the disclosure, the processor 120 may be configured to identify a touch region in which the user input is detected while performing fingerprint recognition, exclude the touch region from a designated effect region for the graphical effect, set the remaining non-touch region obtained by excluding the touch region from the effect region as a region for the graphical effect, and display the designated graphical object through the non-touch region.

According to certain embodiments of the disclosure, the processor 120 may be configured to identify a touch region in which the user input is detected and a touch direction of the user input while performing fingerprint recognition, exclude the touch region from a designated effect region for the graphical effect, and display the designated graphical object based on the touch direction in the remaining non-touch region obtained by excluding the touch region from the effect region.

According to certain embodiments of the disclosure, the processor 120 may be configured to identify a touch region in which the user input is detected and a touch direction of the user input while performing fingerprint recognition, check whether an object is included in the touch region, and provide, when an object is included in the touch region, the graphical effect by changing the object based on at least the touch region or the touch direction.

According to certain embodiments of the disclosure, the processor 120 may be configured to determine whether the object is included in at least one of the touch region or the touch direction based on the location information of the object.

According to certain embodiments of the disclosure, the processor 120 may be configured to provide the graphical effect for a specified time.

According to certain embodiments of the disclosure, the specified time may include a time utilized for recognizing and processing a user's fingerprint through the fingerprint recognition sensor.

According to certain embodiments of the disclosure, the processor 120 may be configured to provide the graphical effect by selecting the graphical object in a random manner or selecting a designated graphical object.

According to certain embodiments of the disclosure, the processor 120 may be configured to extract at least one color from the background color of the screen currently displayed on the display, and provide the color of the graphical object by tinting the extracted at least one color.

In certain embodiments, operations performed by the electronic device 101 to be described below may be executed by at least one processor (e.g., processor 120 in FIG. 1 or FIG. 2) (hereinafter referred to as "processor 120") including at least one processing circuitry of the electronic device 101. According to an embodiment, the operations performed by the electronic device 101 may be executed by instructions that are stored in the memory (e.g., memory 130 in FIG. 1) (hereinafter referred to as "memory 130") and cause the processor 120 to operate when executed.

Figure 7:
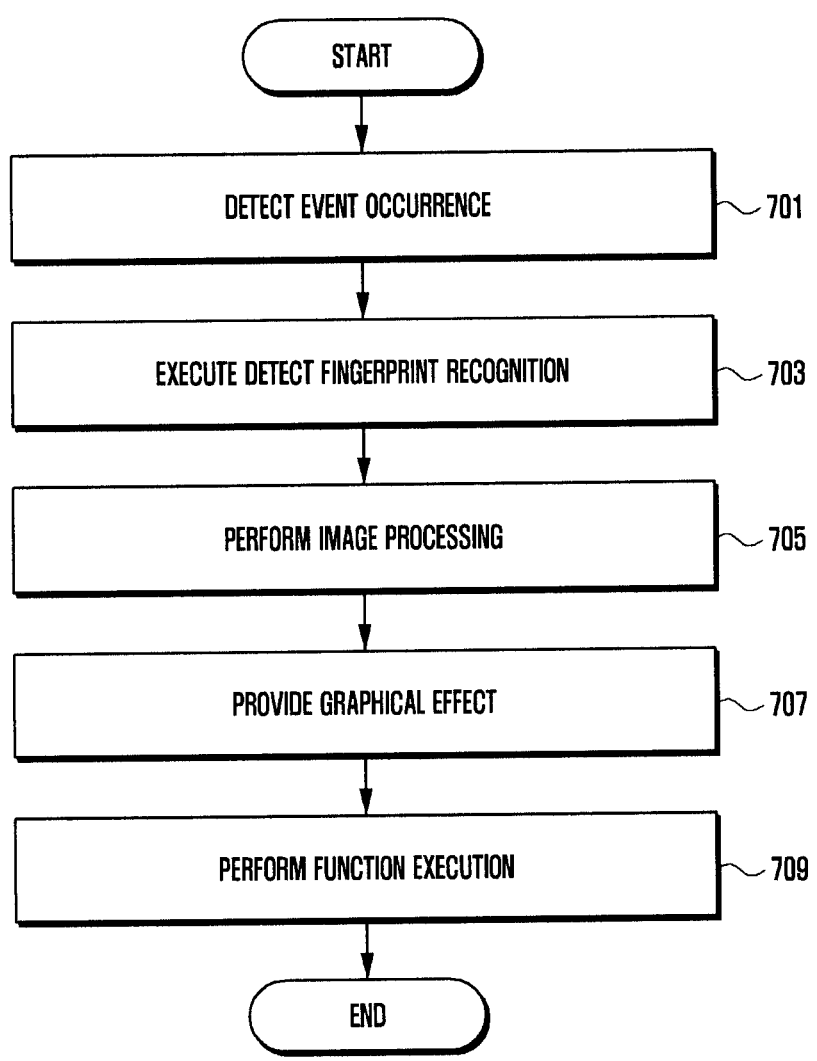
FIG. 7 is a flowchart illustrating an operation method of the electronic device 101 according to certain embodiments.

FIG. 7 is a flowchart illustrating an operation method of the electronic device 101 according to certain embodiments.

According to an embodiment, FIG. 7 may illustrate an example in which the electronic device 101 processes fingerprint recognition through the display fingerprint recognition sensor 200 and provides feedback to the user based on a graphical effect while processing fingerprint recognition.

With reference to FIG. 7, at operation 701, the processor 120 of the electronic device 101 may detect an occurrence of an event. In an embodiment, the event occurrence may include a situation requiring fingerprint authentication, such as, for example, an event entering a fingerprint recognition mode (or, fingerprint mode) operated based on the fingerprint recognition sensor 200. According to an embodiment,
the "fingerprint recognition mode" may be used as a term including a fingerprint registration mode and a fingerprint input mode.

According to an embodiment, the fingerprint registration mode may be a mode in which a fingerprint is initially registered in the electronic device 101. According to an embodiment, the fingerprint input mode is a mode in which a fingerprint is input to perform a specific function (e.g., unlock function or fingerprint-based user authentication) in a state where a fingerprint has been registered, and the electronic device 101 may compare the input fingerprint with the registered fingerprint and perform a corresponding function according to whether there is a match. According to an embodiment, for guiding the user to the fingerprint input position (or, position in which the fingerprint recognition sensor 200 is disposed) of the fingerprint recognition sensor 200, the processor 120 may provide an indicating object (e.g., fingerprint image object and/or guide text) through the fingerprint recognition region (or, region of the indicating object 300) in which the fingerprint recognition sensor 200 is disposed on the display 220.

At operation 703, the processor 120 may execute the fingerprint recognition. According to an embodiment, the processor 120 may operate a fingerprint recognition mode. Subsequently, for example, the processor 120 may detect a user's input (e.g., touch input) in the region where the fingerprint recognition sensor 200 is disposed on the display 220, thereby providing a fingerprint as input.

According to an embodiment, when the user touches a finger on the surface of the display 220, that is, on the region where the fingerprint recognition sensor 200 is disposed on the display 220 (e.g., region where the indicating object 300 is provided) to perform fingerprint recognition, the processor 120 may activate the fingerprint recognition mode. According to an embodiment, the user may input a touch on the fingerprint recognition region (or, region of the indicating object 300) (e.g., display 220 in which the fingerprint recognition sensor 200 is embedded). When a user input (e.g., touch input) is detected through the fingerprint recognition region in a state where the fingerprint recognition mode is activated, the processor 120 may identify this as a fingerprint recognition execution request.

At operation 705, the processor 120 may perform image processing on the received fingerprint, in response to receiving the user input on the fingerprint recognition region. According to an embodiment, the processor 120 may detect a user input (e.g., touch) on the fingerprint recognition region through the fingerprint recognition sensor 200, and scan (or, sense) a user's fingerprint through the fingerprint recognition sensor 200 in response to the user input. In an embodiment, the processor 120 may generate a fingerprint image in response to the progress of fingerprint scan.

At operation 707, the processor 120 may provide (e.g., display) a graphical effect while performing image processing. According to an embodiment, the processor 120 may provide a graphical effect in the touch region (e.g., fingerprint recognition region to which the finger contacts the screen) according to the user input during image processing. For example, the graphical effect may be displayed while sensing the user's fingerprint through the fingerprint recognition sensor 200. According to an embodiment, when providing the fingerprint recognition function, the processor 120 may provide a graphical effect for fingerprint recognition to the user while performing image processing by sensing the fingerprint at the time of detecting a user input (or, while recognizing the user's fingerprint). According to an embodiment, the processor 120 may provide interactive feedback on the user's fingerprint input.

In an embodiment, when providing a graphical effect, the processor 120 may exclude the touch region touched according to the user input (e.g., region hidden from the user's view due to a user's finger touch) and provide a graphical effect based on the remaining non-touch region. For example, the processor 120 may provide a graphical object for a graphical effect based on the non-touch region from which the touch region according to a user input is excluded, or may provide a graphical object included in the touch region by moving it.

According to an embodiment, graphical effects may be handled in various ways according to the characteristic (or type) thereof. For example, graphical effects may be provided in various ways based on the characteristics thereof, such as assigning different designated times for individual characteristics of graphical effects, differently operating dynamic images and static images, moving graphical objects, or dividing and moving graphical objects. Certain embodiments are described with reference to the drawings below in connection with providing graphical effects.

At operation 709, the processor 120 may execute a function corresponding to the authentication of the fingerprint. According to an embodiment, the processor 120 may compare the input fingerprint with a registered fingerprint, and determine whether a match exists. If a match exists, the fingerprint is authenticated and a corresponding function may be executed. For example, the processor 120 may process an operation, such as unlocking the lock screen, executing a locked (or secured) application or content, or automatically entering authentication information related to user authentication (e.g., logging in). According to an embodiment, the processor 120 may execute a related function based on the image processing result, or when authentication based on the input fingerprint has failed, it may display a related screen and terminate (e.g., not display, or restore (e.g., restore the moved graphical object to its original position)) the graphical effect.

Figure 8:
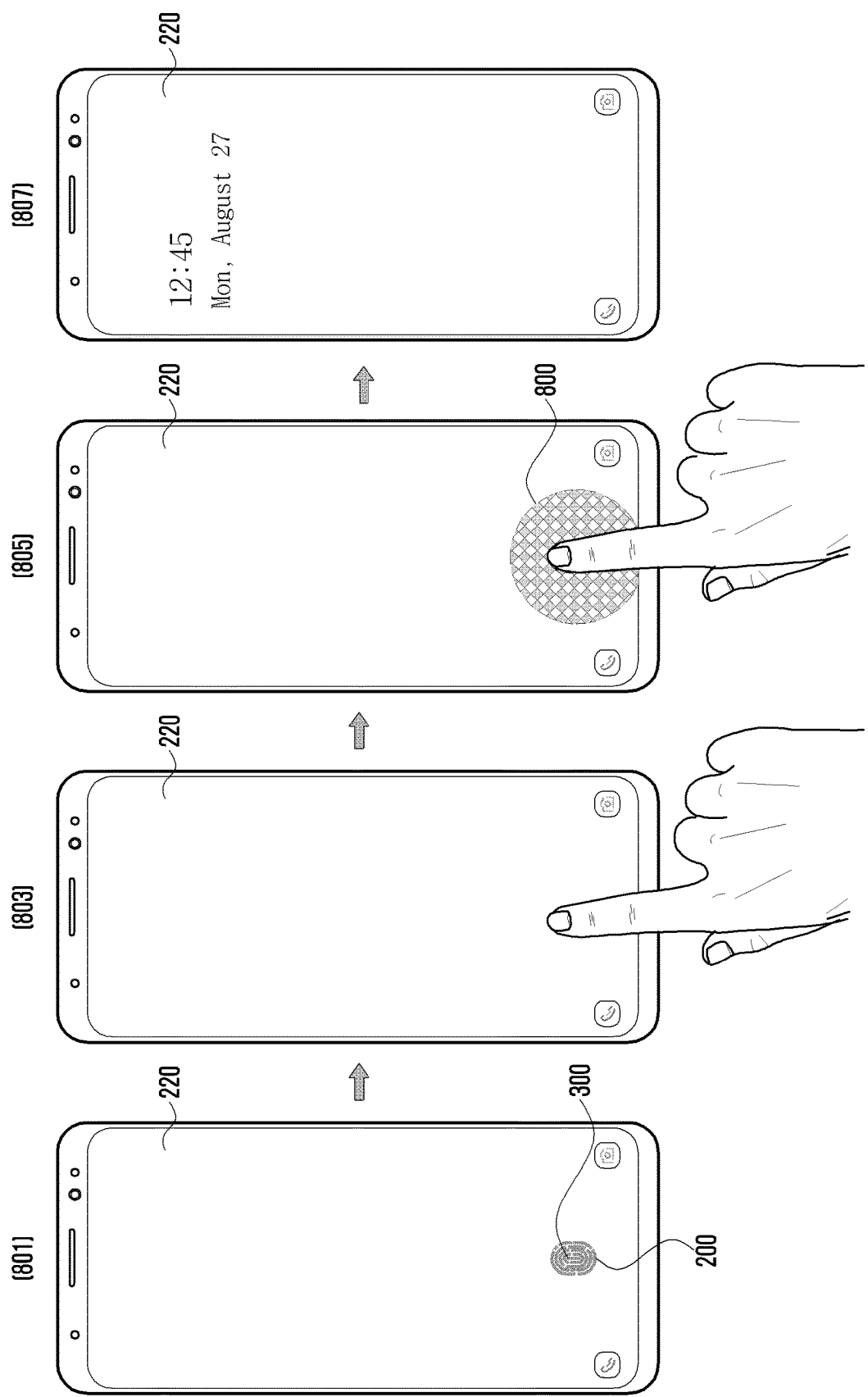
FIG. 8 is a diagram illustrating an example of a user interface providing a graphical effect in the electronic device 101 according to certain embodiments.

FIG. 8 is a diagram illustrating an example of a user interface that provides a graphical effect in the electronic device 101 according to certain embodiments.

With reference to FIG. 8, as in illustrative screen 801, the electronic device 101 may provide a screen through the display 220 in a situation requiring fingerprint input, such as, for example, a fingerprint recognition mode (or, fingerprint mode) operating based on the fingerprint recognition sensor 200. For example, as shown by illustrative screen 801, the electronic device 101 may provide a lock screen on the display 220. According to an embodiment, in the electronic device 101, the fingerprint recognition sensor 200 (e.g., display fingerprint recognition sensor) may be disposed under a designated region of the display 220 (e.g., under panel).

According to an embodiment, the display 220 may display an indicating object 300, which is indicates the location of the fingerprint recognition sensor 220 (or, fingerprint recognition region) and thus provides guidance for the input of the user's fingerprint, on a region (e.g., fingerprint recognition region) corresponding to a location of the fingerprint recognition sensor 200. The indicating object 300 may be displayed through a designated region on the display 220 (e.g., function active state) when performing an operation related to user authentication in a state where it is not displayed on the display 220 (e.g., function inactive state).

As in illustrative screen 803, the electronic device 101 may detect a user's touch. According to an embodiment, the user may enter a finger touch based on the fingerprint recognition region indicated by the indicating object 300. In an embodiment, the electronic device 101 may detect a user input (e.g., touch) on the fingerprint recognition region based on the touch sensor 610. The electronic device 101 may detect a user input on the fingerprint recognition region through the touch sensor 610, and scan (or, sense) a user's fingerprint through the fingerprint recognition sensor 200 based on the user input. In an embodiment, the electronic device 101 may obtain a fingerprint image according to the progress of fingerprint scanning.

As in illustrative screen 805, the electronic device 101 may display a visual effect 800 (or, graphical effect) while scanning a fingerprint (or, performing fingerprint recognition). According to an embodiment, the electronic device 101 may provide the visual effect 800 in a specific range (or radius) with respect to the region (e.g., touch region) where a touch is detected in the fingerprint recognition region. In a certain embodiment (not shown), the electronic device 101 may provide the visual effect 800 with respect to at least a portion of the entire area of the display 220 and/or the edge area of the display 220.

According to an embodiment, for example, the visual effect 800 may use various graphical objects (e.g., digital motion graphics and/or composite objects) (e.g., dynamic objects and/or static objects). For example, the electronic device 101 may provide a vivid visual effect 800 based on animated objects (or, video objects or motion objects).

For example, the electronic device 101 may provide a visual effect (e.g., water wave effect, radial effect) such as a moving wave (or, wave occurring on the water surface) with respect to the region where a touch is detected. For instance, when providing a visual effect such as a water wave effect, the electronic device 101 may provide an effect of spreading without a size change (e.g., displayed within a specified range (or boundary)). As another example, the electronic device 101 may provide a shining light effect based on at least a region of the display 220. As another example, the electronic device 101 may provide a dynamic visual effect by repeatedly outputting a static object. As another example, the electronic device 101 may provide a dynamic visual effect by applying a color and/or a highlight to a static object.

As in illustrative screen 807, the electronic device 101 may control function execution based on the completion of fingerprint recognition. According to an embodiment, the electronic device 101 may compare the obtained fingerprint image with the preregistered fingerprint image, execute a corresponding function according to whether there is a match, and display a related screen on the display 220. For example, the electronic device 101 may display a screen after release of the lock screen. As another example, the electronic device 101 may process an operation such as execution of a locked (or secure) application or content, or automatic input (e.g., log-in) of authentication information related to user authentication.

According to an embodiment, when executing a related function based on the result of image processing, as shown by illustrative screen 807, the electronic device 101 may terminate providing (or, may not display) the visual effect 800 (or, graphical effect). According to an embodiment, on a screen not in the fingerprint recognition mode, the electronic device 101 may not display the indicating object 300 in the fingerprint recognition region of the display 220 as shown by illustrative screen 807.

Figure 9:
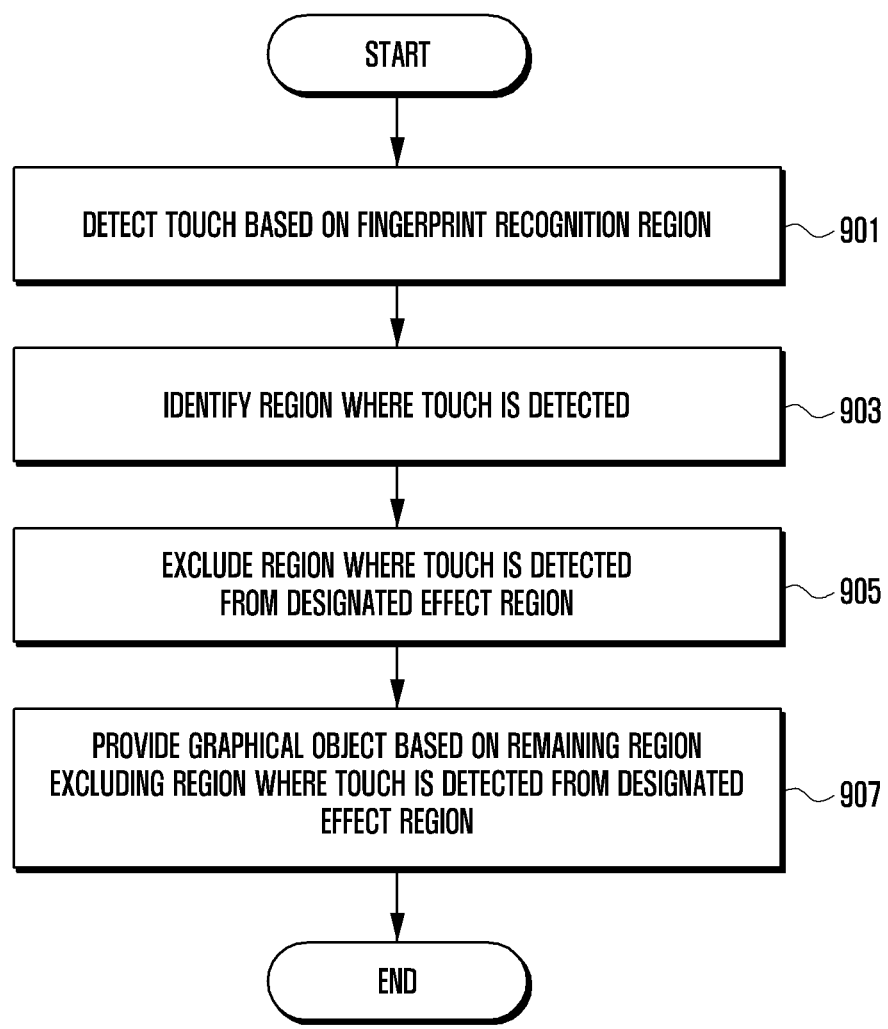
FIG. 9 is a flowchart illustrating an operation method of the electronic device according to certain embodiments.

FIG. 9 is a flowchart illustrating an example operation method of the electronic device 101 according to certain embodiments.

According to an embodiment, FIG. 9 is an illustration in which the electronic device 101 processes fingerprint recognition through the display fingerprint recognition sensor 200, identifies a region in which a touch is detected (e.g., touch region) while processing fingerprint recognition, does not provide (e.g., display) a graphical effect in the region where the touch is sensed, and provides a graphical effect based on the remaining non-touch region excluding the region where the touch is detected.

With reference to FIG. 9, at operation 901, the processor 120 of the electronic device 101 may detect a touch based on a designated fingerprint recognition region. For example, the processor 120 may display an indicating object 300 within a region of the display 220 corresponding to the location of the fingerprint recognition sensor 200, which in turn is disposed at the lower end of the display 220. In an embodiment, the user may recognize the fingerprint recognition region as indicated by the indicating object 300. and therefore enter a finger touch input based on the fingerprint recognition region. According to an embodiment, the processor 120 may detect a touch in the fingerprint recognition region based on the touch sensor 610, and internally (or, in the background) perform an operation of scanning (or, sensing) the user's fingerprint through the fingerprint recognition sensor 200 in response to detection of the touch. For example, the processor 120 may perform fingerprint recognition in the background.

At operation 903, the processor 120 may identify a region in which a touch is detected (e.g., as a touch region). According to an embodiment, the processor 120 may identify (or calculate) a portion and/or area thereof contacted by a user's finger in the fingerprint recognition region. In an embodiment, a description will be given of an example of identifying a region in which a touch is sensed with reference to the following drawings.

At operation 905, the processor 120 may exclude a region in which a touch is sensed from a designated effect region. According to an embodiment, the processor 120 may exclude the region in which a touch is sensed (e.g., region hidden from the user's view due to user's finger touch) from the designated effect region for displaying graphical effects, and set the remaining non-touch region (e.g., region not hidden from the user's view) as a region for graphical effects.

At operation 907, the processor 120 may display a graphical object based on the non-touch region in the designated effect region, excluding display of the graphical object from the touch region in the designated effect region. According to an embodiment, the processor 120 may display a graphical object and/or a visual effect (or, graphical effect) in the non-touch region, excluding the touch region in which the touch input is detected. Thus, the graphical object is not displayed within an entirety of the designated effect region on the display 220.

Figure 10:
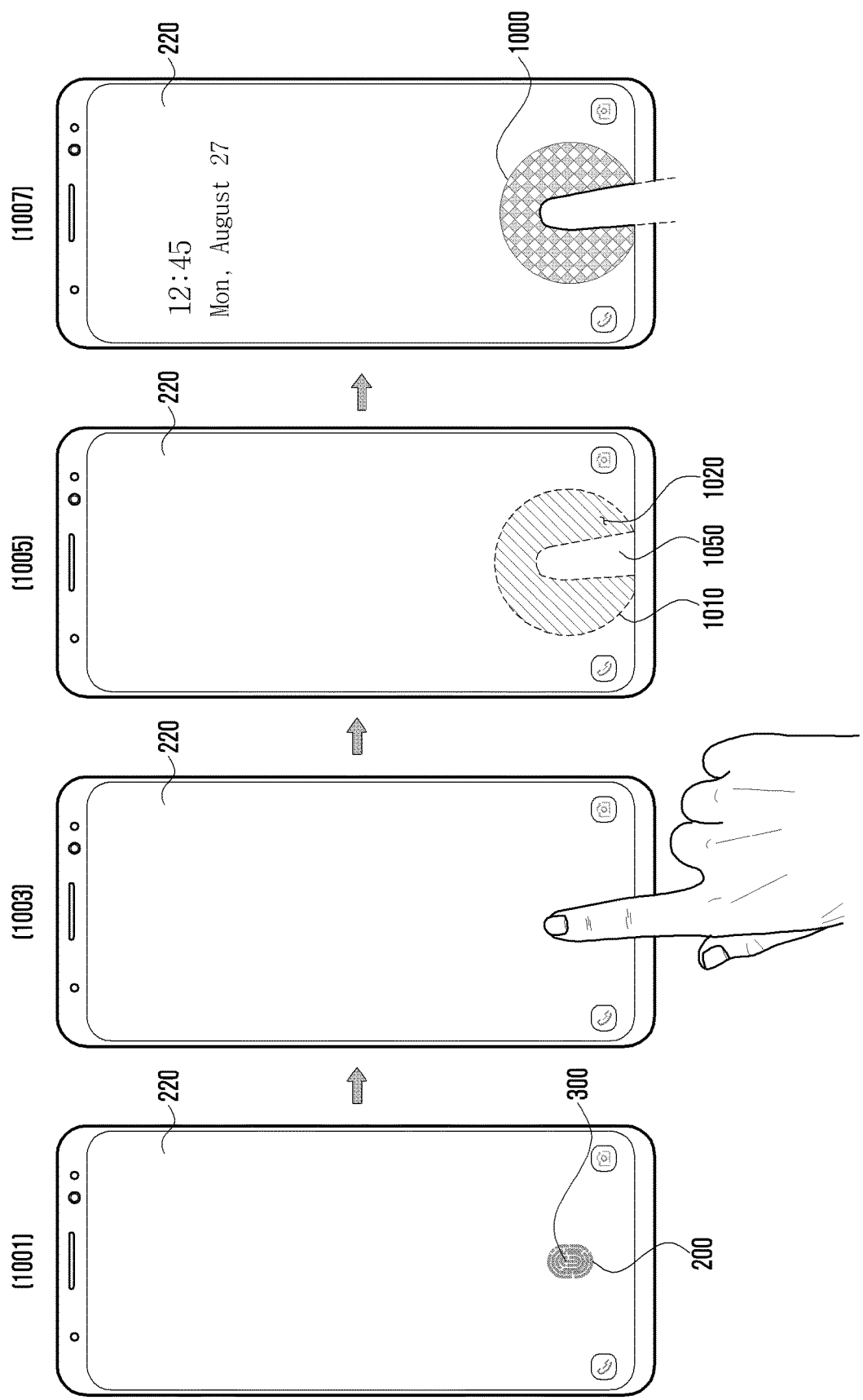
FIG. 10 is a diagram illustrating an example of a user interface providing a graphical effect in the electronic device according to certain embodiments.

FIG. 10 is a diagram illustrating an example of a user interface that provides a graphical effect in the electronic device 101 according to certain embodiments.

With reference to FIG. 10, as in illustrative screen 1001, the electronic device 101 may provide a related screen through the display 220 in a situation requiring fingerprint input, for example, in a fingerprint recognition mode (or, fingerprint mode) operating based on the fingerprint recognition sensor 200. For example, as shown by illustrative screen 1001, the electronic device 101 may provide a lock screen on the display 220. In an embodiment, the display 220 may display an indicating object 300 on a region (e.g., fingerprint recognition region) corresponding to a location of the fingerprint recognition sensor 200. The indicating object 300 may be provided through a designated region on the display 220 (e.g., function active state) when performing an operation related to user authentication in a state where it is not displayed on the display 220 (e.g., function inactive state).

As in illustrative screen 1003, the electronic device 101 may detect a user's touch. According to an embodiment, the user may enter a finger touch based on the fingerprint recognition region indicated by the indicating object 300. In an embodiment, the electronic device 101 may detect a user input (e.g., touch) on the fingerprint recognition region based on the touch sensor 610. The electronic device 101 may detect a user input on the fingerprint recognition region through the touch sensor 610, and scan (or, sense) a user's fingerprint through the fingerprint recognition sensor 200 based on the user input. In an embodiment, the electronic device 101 may obtain a fingerprint image according to the progress of fingerprint scanning.

As in illustrative screen 1005, the electronic device 101 may calculate a region 1050 in which a touch is sensed (e.g., touch region). In an embodiment, the processor 120 may calculate a portion and/or area thereof touched by a user's finger in the fingerprint recognition region. In an embodiment, a description will be given of an example of identifying a region in which a touch is sensed with reference to the following drawings. According to an embodiment, the electronic device 101 may process an operation of calculating a region in which a touch is detected in parallel to an operation of scanning a fingerprint. According to an embodiment, the electronic device 101 may process fingerprint recognition and touch region calculation in parallel in the background. In a certain embodiment, the electronic device 101 may process the operation of calculating the touch region. For example, the electronic device 101 may be operated to process a function for providing a graphical effect and a fingerprint recognition function in parallel, and/or process a function for providing a graphical effect first and then process the fingerprint recognition function.

According to certain embodiments, the electronic device 101 may exclude the touch region 1050 from the designated effect region 1010 for displaying graphical effects. According to an embodiment, the electronic device 101 may exclude the region 1050 in which a touch is sensed (e.g., region hidden from the user's view due to user's finger touch) from the designated effect region 1010 for displaying graphical effects, and display graphical effects in the remaining region 1020 (e.g., region not hidden from the user's view, or the non-touch region).

As in illustrative screen 1007, the electronic device 101 may provide a visual effect 1000 (or, graphical effect) while scanning a fingerprint (or, performing fingerprint recognition). In an embodiment, the electronic device 101 may provide a visual effect using the graphical object 1000 based on the remaining region 1020 obtained by excluding the region 1050 in which a touch is sensed (e.g., touch region) from the designated effect region 1010 for visual effects.

In an embodiment, the graphical object 1000 may be provided based on a specific range (or, radius) (e.g., range in which the designated effect region 1010 is set). In a certain embodiment (not shown), the electronic device 101 may provide the visual effect 1000 with respect to at least a portion of the entire area of the display 220 and/or the edge area of the display 220. According to an embodiment, for example, the visual effect 1000 may use various graphical objects (e.g., digital motion graphics and/or composite objects) (e.g., dynamic objects and/or static objects). For example, the electronic device 101 may provide a vivid visual effect 1000 based on animated objects (or, video objects or motion objects).

For example, the electronic device 101 may provide a visual effect (e.g., water wave effect, radial effect) such as a moving wave (or, wave occurring on the water surface) with respect to the region where a touch is detected. For instance, when providing a visual effect such as a water wave effect, the electronic device 101 may provide an effect of spreading without a size change (e.g., displayed within a specified range (or boundary) such as an effect region 1010). As another example, the electronic device 101 may provide a shining light effect based on at least a region of the display 220. As another example, the electronic device 101 may provide a dynamic visual effect by repeatedly outputting a static object. As another example, the electronic device 101 may provide a dynamic visual effect by applying a color and/or a highlight to a static object.

Figure 11:
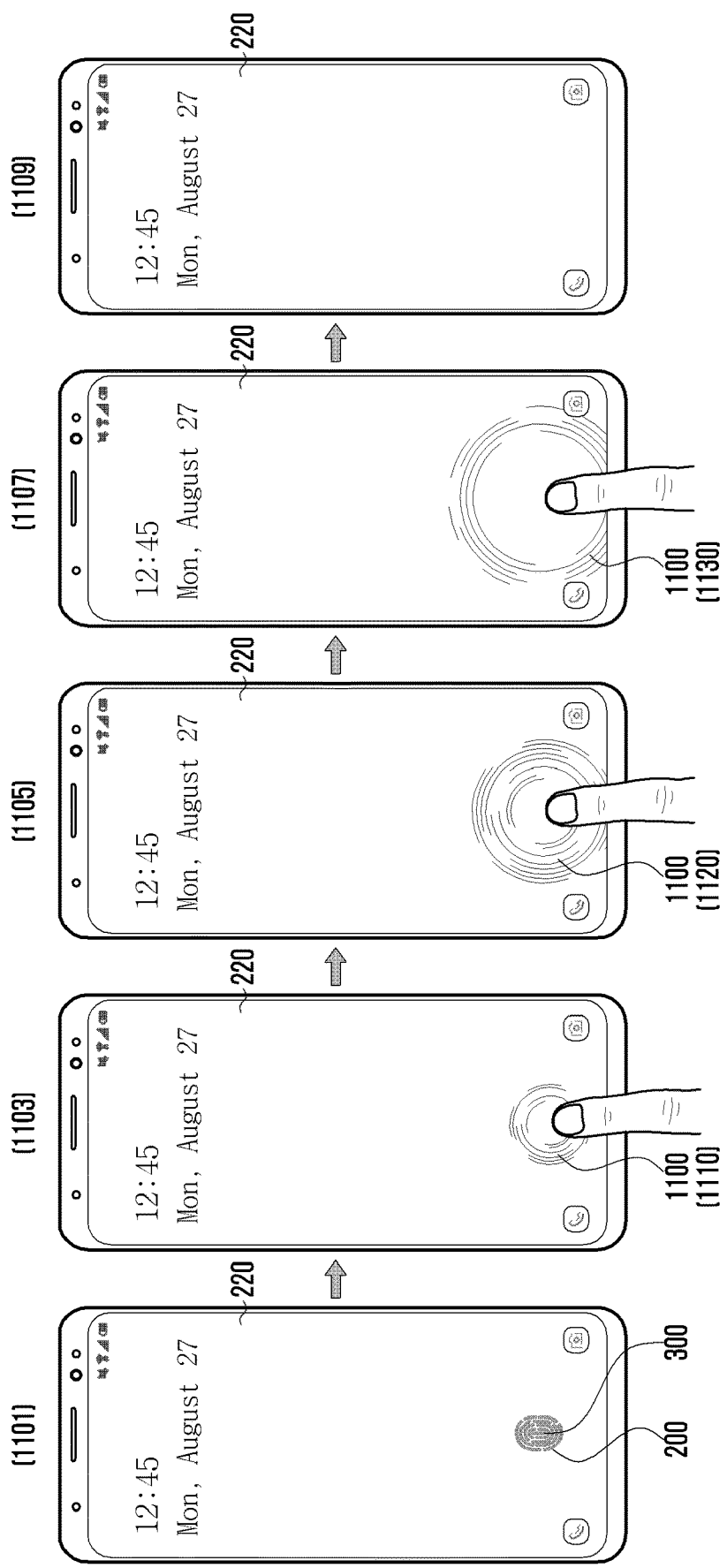
FIG. 11 is a diagram illustrating an example of a user interface providing a graphical effect in the electronic device according to certain embodiments.

FIG. 11 is a diagram illustrating an example of a user interface that provides a graphical effect in the electronic device 101 according to certain embodiments.

With reference to FIG. 11, as in illustrative screen 1101, the electronic device 101 may provide a related screen through the display 220 in a situation requiring fingerprint input, for example, in a fingerprint recognition mode (or, fingerprint mode) operating based on the fingerprint recognition sensor 200. For example, as shown by illustrative screen 1101, the electronic device 101 may provide a lock screen on the display 220. In an embodiment, the display 220 may display an indicating object 300 on a region (e.g., fingerprint recognition region) corresponding to a location of the fingerprint recognition sensor 200. The indicating object 300 may be provided through a designated region on the display 220 (e.g., function active state) when performing an operation related to user authentication in a state where it is not displayed on the display 220 (e.g., function inactive state).

As in illustrative screen 1103, the user may enter a finger touch based on the fingerprint recognition region indicated by the indicating object 300. In an embodiment, the electronic device 101 may detect a user input (e.g., touch) on the fingerprint recognition region based on the touch sensor 610. The electronic device 101 may detect a user input on the fingerprint recognition region through the touch sensor 610, and scan (or, sense) a user's fingerprint through the fingerprint recognition sensor 200 based on the user input. In an embodiment, the electronic device 101 may obtain a fingerprint image according to the progress of fingerprint scanning.

As in illustrative screens 1103 to 1107, the electronic device 101 may provide a visual effect (or, graphical effect) based on a graphical object 1100 while scanning a fingerprint (or, performing fingerprint recognition). According to an embodiment, the electronic device 101 may provide a visual effect in which the graphical object 1100 dynamically changes in size (e.g., expanding in radius) (e.g., within a designated effect region) centered on the region where a touch is detected (e.g., touch region) in the fingerprint recognition region.

According to an embodiment, animated objects (or, video objects, motion objects) may be sequentially displayed by using digital motion graphics and/or composite objects. For example, the electronic device 101 may provide a vivid visual effect (e.g., water wave effect) such as a wave occurring on the water surface, like a first sub-object 1110 of the graphical object 1100 in illustrative screen 1103, a second sub-object 1120 of the graphical object 1100 in illustrative screen 1105, or a third sub-object 1130 of the graphical object 1100 in illustrative screen 1107. In an embodiment, when providing a visual effect such as a water wave effect, the electronic device 101 may provide an effect of spreading without a size change (e.g., displayed within a specified range (or boundary)).

As in illustrative screens 1103 to 1107, the electronic device 101 may detect a region in which a touch is detected (e.g., touch region), and exclude the touched region from display of the designated effect region for visual effects. According to an embodiment, the electronic device 101 may provide a visual effect by using the graphical object 1100 based on the remaining region (e.g., region not hidden from the user's view) obtained by excluding the region in which a touch is sensed (e.g., region hidden from the user's view due to the user's finger touch) from the designated effect region for the graphical effect 1100.

As in illustrative screen 1109, the electronic device 101 may control function execution based on the completion of fingerprint recognition. According to an embodiment, the electronic device 101 may compare the obtained fingerprint image with the preregistered fingerprint image, and once authenticated, execute a corresponding function according to whether there is a match, and display a related screen on the display 220. For example, the electronic device 101 may display a screen from which the lock screen is released. As another example, the electronic device 101 may process an operation such as execution of a locked (or secure) application or content, or automatic input (e.g., log-in) of authentication information related to user authentication. According to an embodiment, when executing a related function based on the result of image processing, as shown by illustrative screen 1109, the electronic device 101 may terminate providing (or, may not display) the visual effect (or, graphical object 1100). According to an embodiment, on a screen not in the fingerprint recognition mode, the electronic device 101 may not display the indicating object 300 in the fingerprint recognition region of the display 220 as shown by illustrative screen 1109.

According to certain embodiments of the disclosure, when fingerprint recognition (or user authentication) is performed by using the display fingerprint recognition sensor 200, a touch input interaction is detected in the area touched by the user's finger, and a graphical element (e.g., graphical object) does not appear in the touched portion (e.g., touch region) and may be displayed in the remaining region except for the touched portion.

According to certain embodiments, the visual effect by a graphical object may be provided, for example, for a specified time (e.g., about 1000 ms). According to an embodiment, the specified time may be set to a time corresponding or close to, for example, the time utilized to recognize and process a user's fingerprint through the fingerprint recognition sensor 200. According to certain embodiments, the type of graphical objects may be provided randomly, or at least one designated graphical object may be provided. For example, the electronic device 101 (or, processor 120) may provide a graphical effect by selecting a graphical object in a random manner based on a method set in the electronic device 101, or selecting a specific graphical object designated by the user.

According to certain embodiments, the color of a graphical object may be automatically set based on, for example, the color of a background screen of a currently displayed screen, or may be provided based on a preset color. For example, the color of a graphical object may be provided by tinting one or more (e.g., two colors) selected through color extraction from the background color of the currently displayed screen. For example, the electronic device 101 (or, processor 120) may extract at least one color from the background color of the screen, tint the at least one extracted color, and set it as the color of a graphical object.

Figure 12:
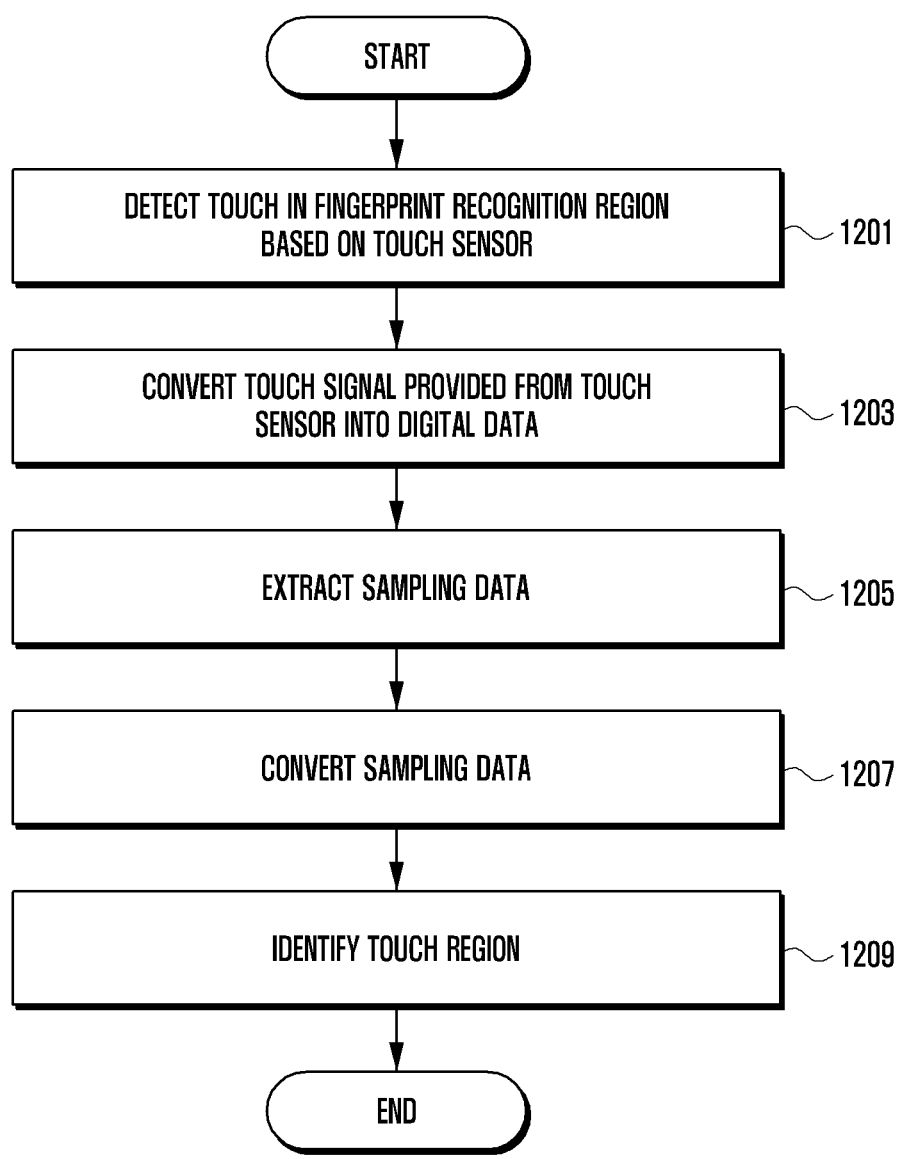
FIG. 12 is a flowchart illustrating an operation method of the electronic device according to certain embodiments.
Figure 13:
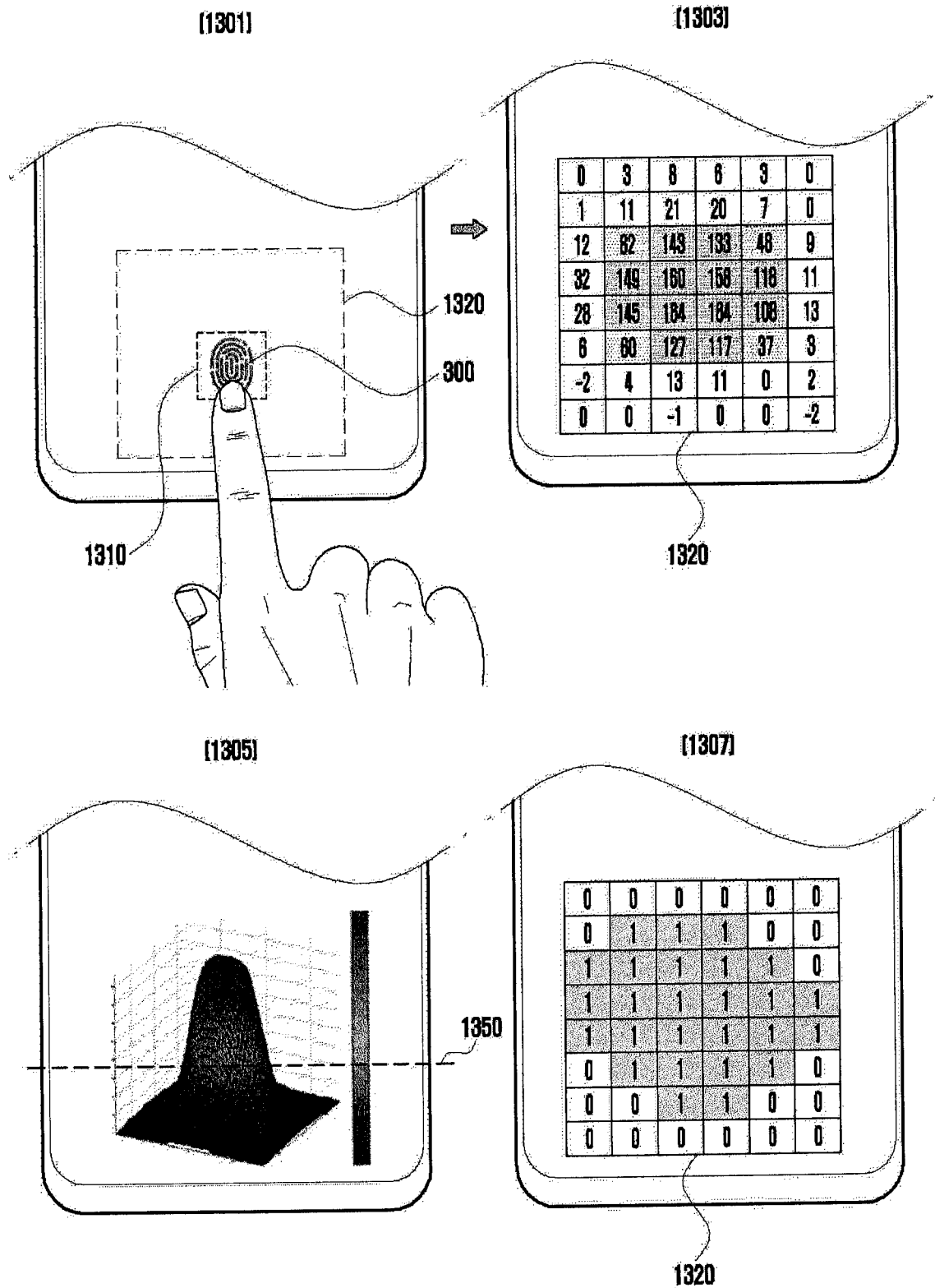
FIG. 13 is a diagram illustrating an example of identifying a region in which a touch is sensed in the electronic device according to certain embodiments.

FIG. 12 is a flowchart illustrating an operation method of the electronic device 101 according to certain embodiments. FIG. 13 is a diagram illustrating an example of identifying a region in which a touch is sensed in the electronic device 101 according to certain embodiments.

According to an embodiment, FIGS. 12 and 13 may illustrate an example in which the electronic device 101 identifies a region where a touch is detected (e.g., touch region) in the fingerprint recognition region.

With reference to FIGS. 12 and 13, at operation 1201, the processor 120 of the electronic device 101 may detect a touch in the fingerprint recognition region based on the touch sensor 610. For example, as shown by illustrative screen <1301> of FIG. 13, the user may enter a finger touch based on the fingerprint recognition region 1310 indicated by the indicating object 300.

In an embodiment, the processor 120 may detect a touch in the fingerprint recognition region 1310 based on the touch sensor 610, and internally (or, in the background) perform an operation of scanning (or, sensing) the user's fingerprint through the fingerprint recognition sensor 200 in response to detection of the touch. According to an embodiment, as shown by illustrative screen <1301>, the electronic device 101 may detect a touch according to a touch signal provided (or input) from the touch sensor 610 based on a specific region 1320 (e.g., effect region) of a specified range adjacent to the fingerprint recognition sensor 200.

At operation 1203, the processor 120 may convert a touch signal provided from the touch sensor 610 into digital data. In an embodiment, as shown by illustrative screen <1303> of FIG. 13, the processor 120 may convert the touch signal input from the touch sensor 610 into digital data based on the specific region 1320.

At operation 1205, the processor 120 may extract sampling data. According to an embodiment, based on the converted digital data, the processor 120 may extract data (e.g., sampling data) at a level that can be determined as a user's finger contact (e.g., touch) from the specific region 1320. In an embodiment, as shown by illustrative screen <1305> of FIG. 13, the processor 120 may extract digital data having an intensity (or sensitivity) greater than or equal to a specified reference (e.g., threshold) 1350 from among the digital data of the specific region 1320 as sampling data.

At operation 1207, the processor 120 may convert the sampling data. According to an embodiment, the processor 120 may separate a zone corresponding to the sampling data extracted from the specific region 1320 (e.g., first zone) and a remaining zone (e.g., second zone), and convert the data of the first zone and the second zone into different digital values (e.g., binary values '0' and '1'). In an embodiment, as shown by illustrative screen <1307> of FIG. 13, information about the finger contact region (e.g., touch region) may be obtained by setting the first zone corresponding to the extracted sampling data to '1', and setting the second zone corresponding to the remaining region is set to '0'.

At operation 1209, the processor 120 may identify the touch region. According to an embodiment, the processor 120 may set (or identify) a touch region where a touch is detected based on the region set to have the digital value '1' within the specific region 1320.

According to certain embodiments, the processor 120 may receive measurement values from the touch sensor 610 and perform a function of determining a touch region. According to an embodiment, when a touch event (e.g., key event function) related to the fingerprint recognition region 1310 is received from the touch sensor 610, the processor 120 may perform a function of determining a touch region and a non-touch region in the specific region 1320. In an embodiment, based on digital data related to a touch event, the processor 120 may identify sampling data having a value (e.g., intensity value) of a preset level or higher (e.g., region recognized as actually having finger contact).

According to an embodiment, when sampling data is not recognized, for example, when all digital values of the sampling data are '0', the processor 120 may provide a visual effect by displaying a graphical object based on the whole of the specific region 1320. According to an embodiment, when at least some of the sampling data is recognized, for example, when at least some digital values of the sampling data are '1', the processor 120 may exclude a region whose digital value is set to '1' (e.g., touch region) from the specific region 1320, and provide a visual effect by displaying a graphical object based on the remaining region (e.g., region whose digital value is set to '0' (e.g., non-touch region)) excluding the touch region.

Figure 14:
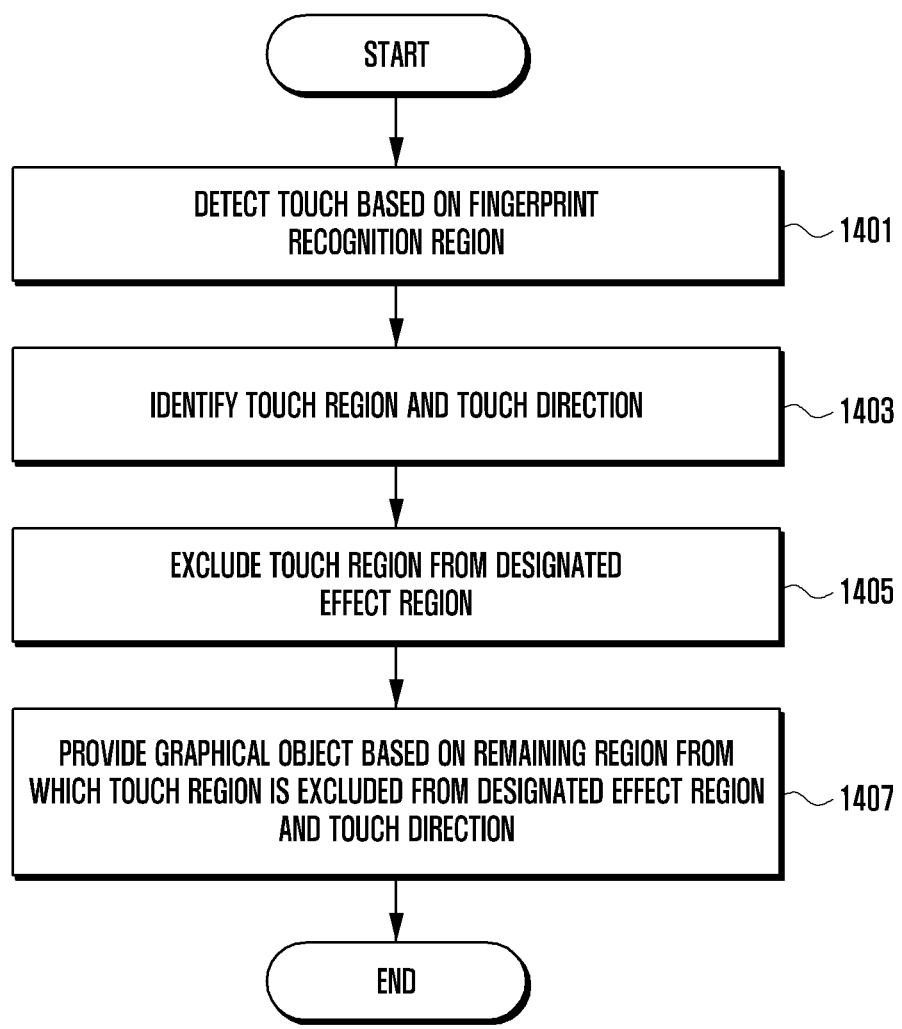
FIG. 14 is a flowchart illustrating an operation method of the electronic device according to certain embodiments.

FIG. 14 is a flowchart illustrating an operation method of the electronic device 101 according to certain embodiments.

According to an embodiment, the electronic device 101 of FIG. 14 processes fingerprint recognition through the display fingerprint recognition sensor 200, identifies a region in which a touch is detected (e.g., touch region) and the direction of the touch (or, touch input direction) while processing fingerprint recognition, does not provide (e.g., display) a graphical effect in the region where the touch is sensed, and provides a graphical effect in the remaining region excluding the region where the touch is detected based on the touch direction.

With reference to FIG. 14, at operation 1401, the processor 120 of the electronic device 101 may detect a touch based on a designated fingerprint recognition region. For example, the processor 120 may display an indicating object 300 on a region of the display 220 corresponding to the location of the fingerprint recognition sensor 200 disposed at the lower end of the display 220. In an embodiment, the user may recognize the fingerprint recognition region indicated by the indicating object 300 and enter a finger touch based on the fingerprint recognition region. According to an embodiment, the processor 120 may detect a touch in the fingerprint recognition region based on the touch sensor 610, and internally (or, in the background) perform an operation of scanning (or, sensing) the user's fingerprint through the fingerprint recognition sensor 200 in response to detection of the touch. For example, the processor 120 may perform fingerprint recognition in the background.

At operation 1403, the processor 120 may identify a region where a touch is detected (e.g., touch region) and a touch direction (e.g., touch input direction). According to an embodiment, the processor 120 may identify (e.g., or calculate) a portion and/or an area thereof touched by a user's finger in the fingerprint recognition region. According to an embodiment, the processor 120 may determine the direction of user's finger contact in the fingerprint recognition region. According to an embodiment, the processor 120 may detect a proximity event in which a user's touch approaches (or hovers) and enters based on the touch sensor 610, and determine a first point at which the user's finger enters (or corresponding to an edge of the display 220) based on the region where the proximity event is detected. In an embodiment, the processor 120 may detect a touch event in which the user's finger is touched after the user's finger enters, and determine a second point corresponding to the tip of the user's finger based on the region where the touch event is detected (e.g., edge portion where the user's fingertip is in contact).

According to an embodiment, the processor 120 may identify the touch direction based on the first point and the second point. For example, the processor 120 may draw a virtual line between the first point and the second point (e.g., connect the first point and the second point with an artificially set line), determine the orientation based on the drawn line, and determine the touch direction based on the determined orientation. In an embodiment, the orientation may be calculated by using a method of 360-degree angle with respect to an artificial line between the first point (e.g., start point) and the second point (e.g., target point). For example, a circle may be divided into 360 equal parts, the angle may be measured while rotating in a clockwise direction (or, counterclockwise direction), and the direction may be determined based on the angle.

At operation 1405, the processor 120 may exclude the touch region from the designated effect region. According to an embodiment, the processor 120 may exclude the region in which a touch is detected (e.g., the region hidden from the user's view due to obscuration by the user's finger touch) from the designated effect region for graphical effects, and set the remaining non-touch region (e.g., the region not hidden from the user's view) as a region for displaying graphical effects.

At operation 1407, the processor 120 may display a graphical object in the remaining non-touch region, excluding the touch region where a touch is detected from the designated effect region, based on the touch direction (or, the touch direction and the touch direction). According to an embodiment, the processor 120 may display a graphical object, a visual effect, or a graphic effect based on the touch direction in the non-touch region, excluding the region in which a touch is detected. Thus, the graphical object and/or effect is not displayed in the entire designated effect region on the display 220.

Figure 15:
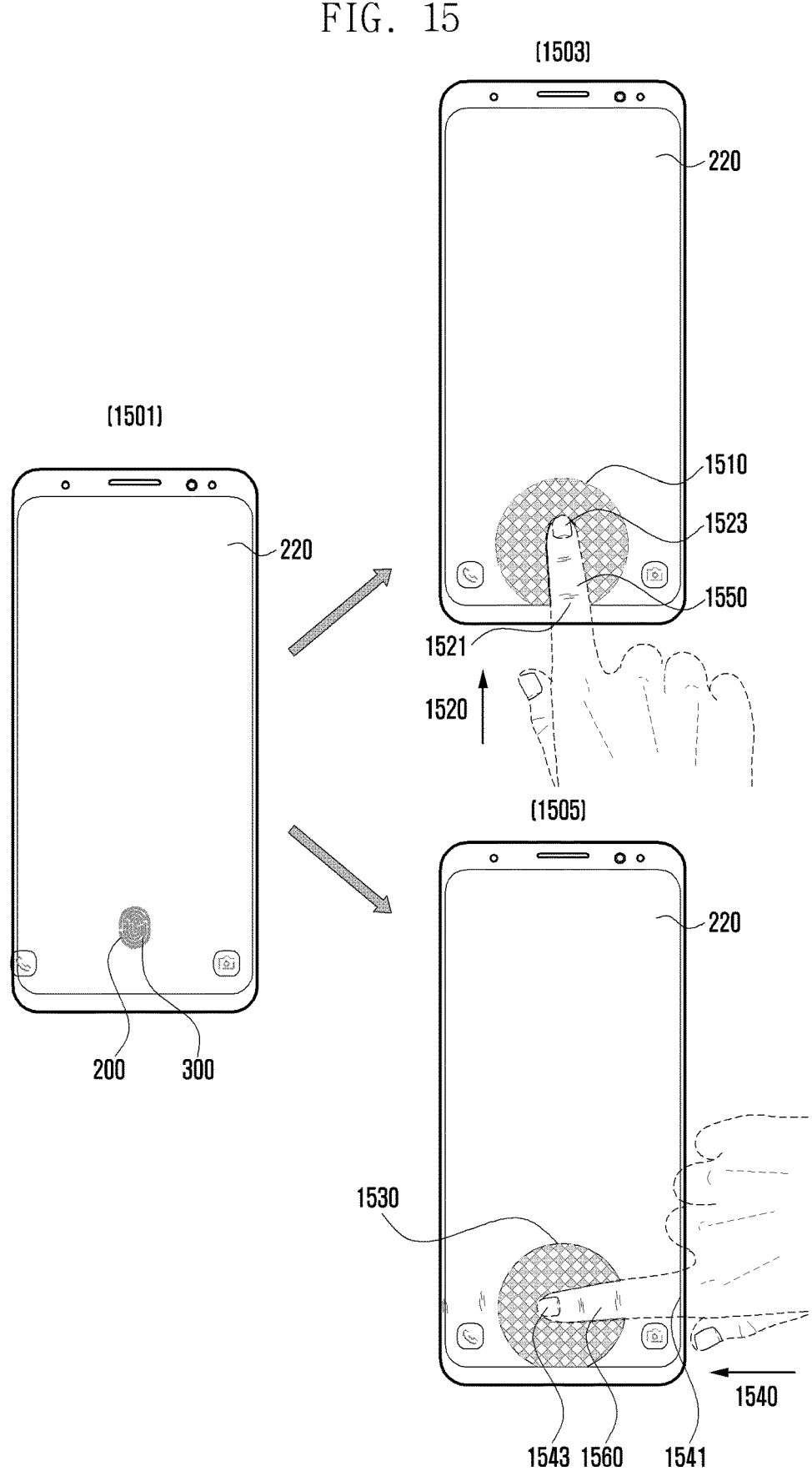
FIG. 15 is a diagram illustrating an example of a user interface providing a graphical effect in the electronic device according to certain embodiments.

FIG. 15 is a diagram illustrating an example of a user interface that provides a graphical effect in the electronic device 101 according to certain embodiments.

With reference to FIG. 15, as in illustrative screen 1501, the electronic device 101 may provide a screen through the display 220 in a situation requiring fingerprint input, for example, in a fingerprint recognition mode (or, fingerprint mode) operating based on the fingerprint recognition sensor 200. For example, as shown by illustrative screen 1501, the electronic device 101 may provide a lock screen on the display 220. In an embodiment, the display 220 may display an indicating object 300 on a region (e.g., fingerprint recognition region) corresponding to a location of the fingerprint recognition sensor 200.

As in illustrative screens 1503 or 1505, the user may recognize the fingerprint recognition region indicated by the indicating object 300, and enter a finger touch to the fingerprint recognition region. According to an embodiment, the electronic device 101 may detect a touch in the fingerprint recognition region based on the touch sensor 610.

According to certain embodiments, the electronic device 101 may identify a region in which a touch is detected (e.g., touch region 1550 or 1560) and a touch direction (or, touch input direction indicative of a path) 1520 or 1540, and provide a graphical object 1510 or 1530 based on the touch region 1550 or 1560 and the touch direction 1520 or 1540. According to an embodiment, the electronic device 101 may determine the direction 1520 or 1540 of contact between the touch region 1550 or 1560 and the user's finger in the fingerprint recognition region. In an embodiment, the electronic device 101 may identify the touch direction (or, touch input direction) indicating a rough path from a first point 1521 or 1541 to a second point 1523 or 1543 (e.g., direction 1520 entering the display 220 from bottom to top, direction 1540 entering the display 220 from right to left).

According to certain embodiments, the electronic device 101 may exclude the touch region 1550 or 1560 in which a touch is detected (e.g., the region hidden from the user's view due to user's finger touch) from the effect region for graphical effects, and set the remaining non-touch region (e.g., the region not hidden from the user's view) as a region for displaying graphical effects. According to an embodiment, the electronic device 101 may provide a visual effect by using a graphical object 1510 or 1530 in the remaining non-touch region, excluding the touch region 1550 or 1560 from the effect region based on the touch direction 1520 or 1540 (or, touch region 1550 or 1560 and touch direction 1520 or 1540). According to an embodiment, the electronic device 101 may display a graphical object 1510 or 1540 for a visual effect (or, graphical effect) based on the touch direction 1520 or 1540 in the remaining region except for the touch region 1550 or 1560 in which a touch is detected, resulting in display of the graphical object in less than the entire designated effect region on the display 220.

According to an embodiment, the electronic device 101 may provide a visual effect (e.g., water wave effect) such as a moving wave (or, wave occurring on the water surface) with respect to the touch region 1550 or 1560 where a touch is detected. For instance, when providing a visual effect such as a water wave effect, the electronic device 101 may provide an effect of spreading without a size change (e.g., displayed within a specified range (or boundary) like an effect region).

Figure 16:
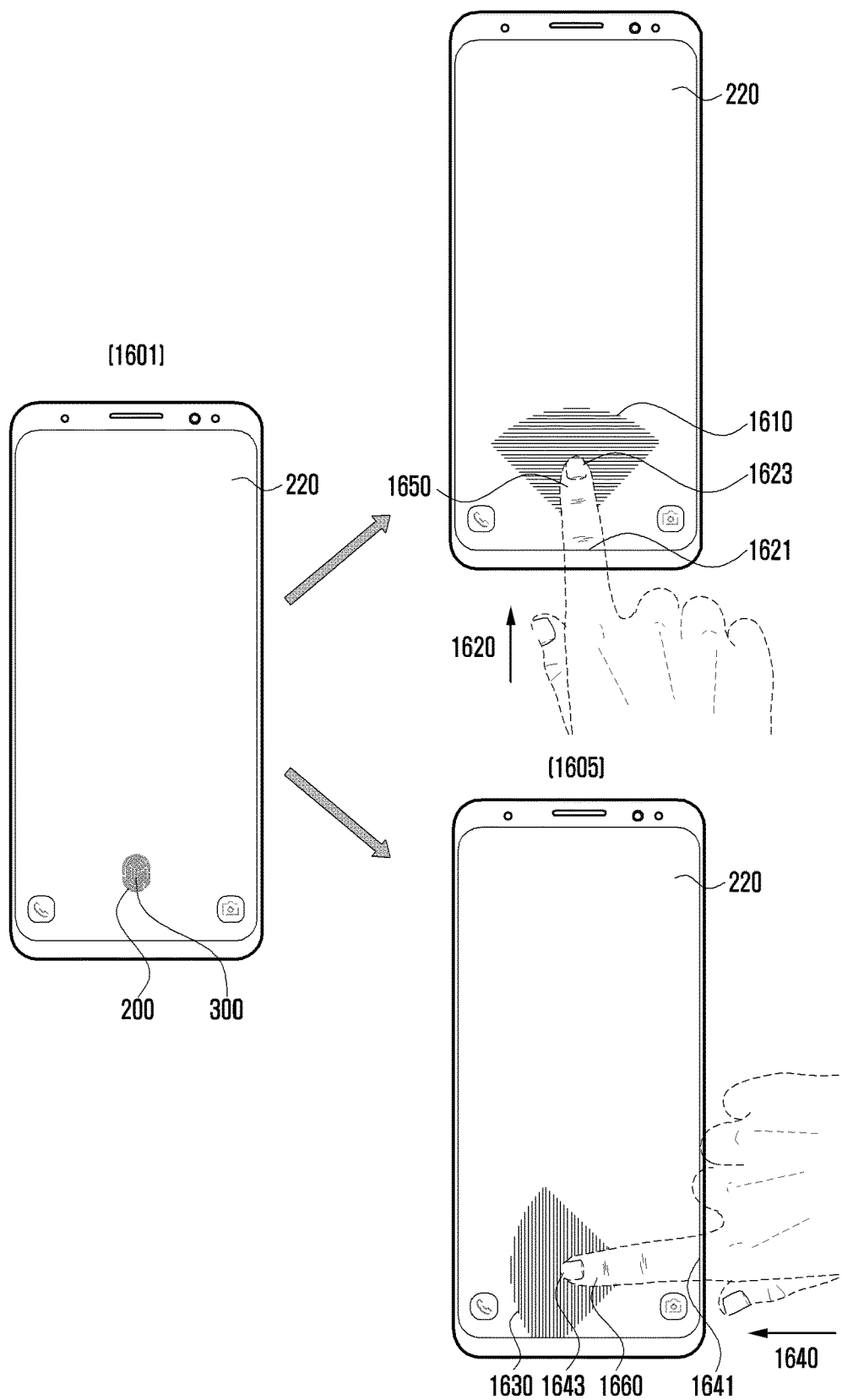
FIG. 16 is a diagram illustrating an example of a user interface providing a graphical effect in the electronic device according to certain embodiments.

FIG. 16 is a diagram illustrating an example of a user interface that provides a graphical effect in the electronic device 101 according to certain embodiments.

With reference to FIG. 16, as in illustrative screen 1601, the electronic device 101 may provide a screen through the display 220 in a situation requiring fingerprint input, for example, in a fingerprint recognition mode (or, fingerprint mode) operating based on the fingerprint recognition sensor 200. For example, as shown by illustrative screen 1601, the electronic device 101 may provide a lock screen on the display 220. In an embodiment, the display 220 may display an indicating object 300 on a region (e.g., fingerprint recognition region) corresponding to a location of the fingerprint recognition sensor 200.

As in illustrative screen 1603 or 1605, the user may recognize the fingerprint recognition region via the indicating object 300, and enter a finger touch to the fingerprint recognition region. According to an embodiment, the electronic device 101 may detect a touch in the fingerprint recognition region based on the touch sensor 610.

According to certain embodiments, the electronic device 101 may identify a region in which a touch is detected (e.g., touch region 1650 or 1660) and a touch direction (or, touch input direction) 1620 or 1640, and provide a graphical object 1610 or 1630 based on the touch region 1650 or 1660 and the touch direction 1620 or 1640. According to an embodiment, the electronic device 101 may determine the direction 1620 or 1640 of contact between the touch region 1650 or 1660 and the user's finger in the fingerprint recognition region. In an embodiment, the electronic device 101 may identify the touch direction (or, touch input direction) from a first point 1621 or 1641 to a second point 1623 or 1643 (e.g., direction 1620 entering the display 220 from bottom to top, direction 1640 entering the display 220 from right to left).

According to certain embodiments, the electronic device 101 may exclude the touch region 1650 or 1660 in which a touch is detected (e.g., region hidden from the user's view due to user's finger touch) from display of graphical effects in the effects region, and set the remaining non-touch region (e.g., region not hidden from the user's view) as a region for displaying graphical effects. According to an embodiment, the electronic device 101 may provide a visual effect by using a graphical object 1610 or 1630 in the remaining non-touch region excluding the touch region 1650 or 1660 from the effect region based on the touch direction 1620 or 1640 (or, touch region 1650 or 1660 and touch direction 1620 or 1640). According to an embodiment, the electronic device 101 may display a graphical object 1610 or 1640 for a visual effect (or, graphical effect) based on the touch direction 1620 or 1640 in the remaining region except for the touch region 1650 or 1660 in which a touch is detected, not the entire designated effect region on the display 220.

According to an embodiment, the electronic device 101 may provide a visual effect (e.g., one-way spreading effect) such as a wave (or energy) gradually spreading with the touch region 1650 or 1660 in which a touch is detected as a starting point. For instance, when the graphical object provides a visual effect such as an effect of gradually spreading from a starting point, the electronic device 101 may provide an effect of spreading without a size change (e.g., displayed within a specified range (or boundary) like an effect region).

Figure 17:
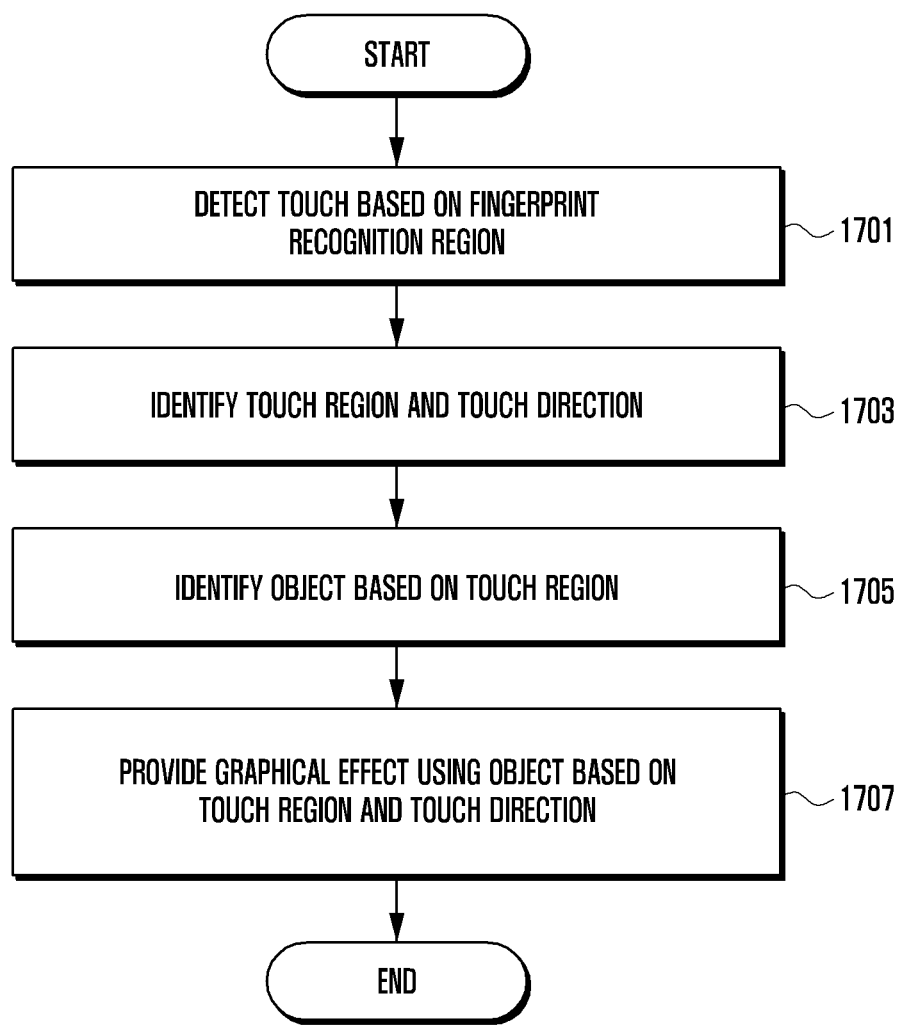
FIG. 17 is a flowchart illustrating an operation method of the electronic device according to certain embodiments.

FIG. 17 is a flowchart illustrating an operation method of the electronic device 101 according to certain embodiments.

According to an embodiment, the electronic device 101 of FIG. 17 processes fingerprint recognition through the display fingerprint recognition sensor 200, identifies a region in which a touch is detected (e.g., touch region) and the direction of the touch (or, touch input direction) while processing fingerprint recognition, and provides a graphical effect (e.g., object segmentation and/or movement) based on the touch region and the touch direction when an object is contained in the touch region.

With reference to FIG. 17, at operation 1701, the processor 120 of the electronic device 101 may detect a touch based on a designated fingerprint recognition region. For example, the processor 120 may display an indicating object 300 on a region of the display 220 corresponding to the location of the fingerprint recognition sensor 200 disposed at the lower end of the display 220. In an embodiment, the user may recognize the fingerprint recognition region indicated by the indicating object 300 and enter a finger touch based on the fingerprint recognition region. According to an embodiment, the processor 120 may detect a touch in the fingerprint recognition region based on the touch sensor 610, and internally (or, in the background) perform an operation of scanning (or, sensing) the user's fingerprint through the fingerprint recognition sensor 200 in response to detection of the touch. For example, the processor 120 may perform fingerprint recognition in the background.

At operation 1703, the processor 120 may identify a region where a touch is detected (e.g., touch region) and a touch direction (e.g., a path of a touch input direction). According to an embodiment, the processor 120 may identify (or, calculate) a portion and/or an area thereof touched by a user's finger in the fingerprint recognition region. According to an embodiment, the processor 120 may determine the direction of user's finger contact in the fingerprint recognition region.

At operation 1705, the processor 120 may identify an object based on the touch region in the designated effect area. For example, the processor 120 may determine whether there is a display object included in (or, overlapping) the touch region. According to an embodiment, the processor 120 may determine whether there is at least one display object in the touch region (e.g., region hidden from the user's view due to the user's finger touch) based on at least location information of the object in the designated effect region for graphical effects.

At operation 1707, the processor 120 may provide a graphical effect (or, visual effect) using the object based at least on the touch region or the touch direction. According to an embodiment, when there is a display object included in (or overlapping) the touch region in the designated effect region on the display 220, the processor 120 may provide a visual effect (or, graphical effect) by segmenting, moving and/or relocating the object based at least on the touch region and/or the touch direction so that the display object does not overlap the touch region (e.g., so as not to be hidden from the user's view due to user's finger touch).

Figure 18:
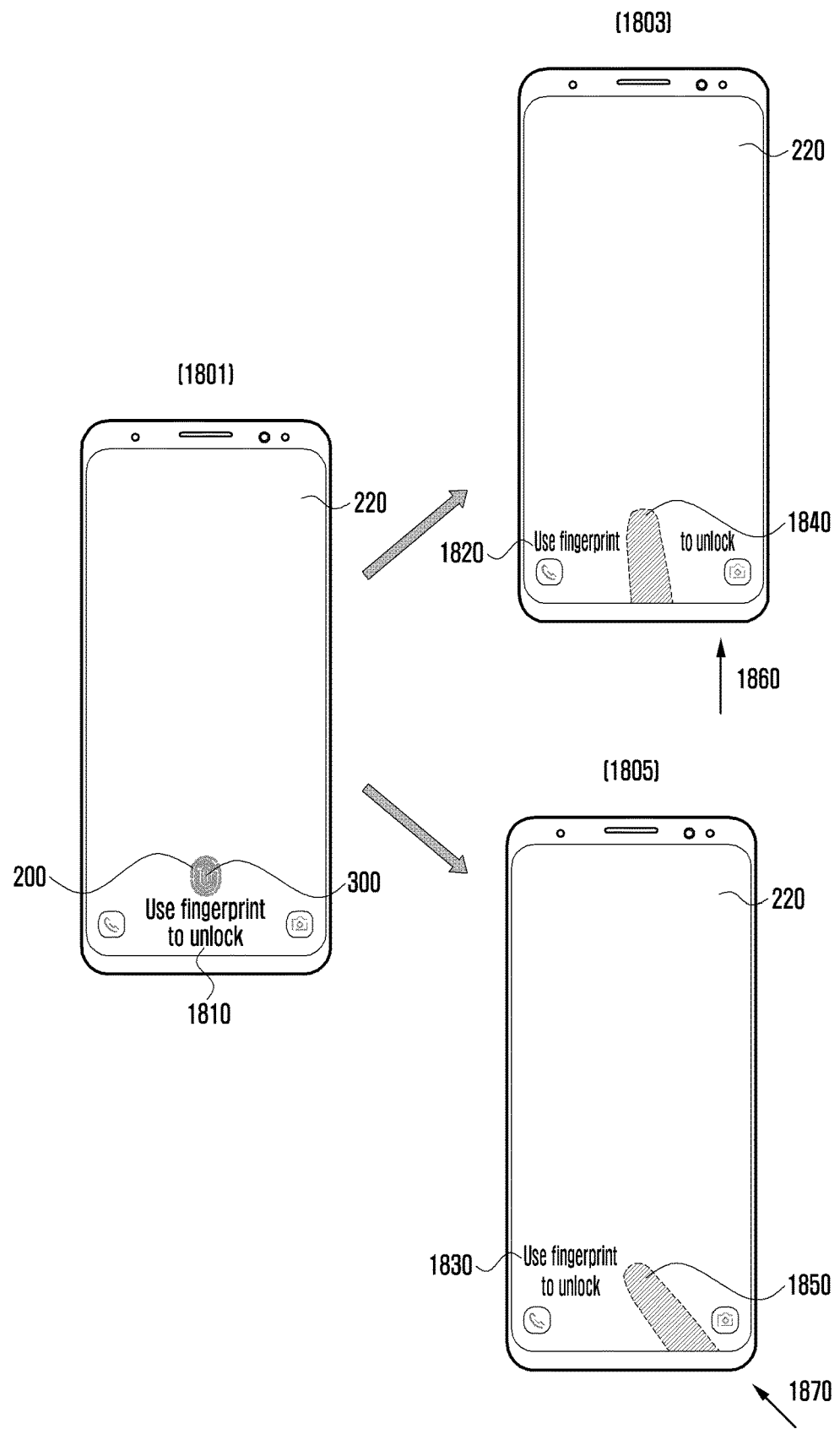
FIG. 18 is a diagram illustrating an example of a user interface providing a graphical effect in the electronic device according to certain embodiments.

FIG. 18 is a diagram illustrating an example of a user interface that provides a graphical effect in the electronic device 101 according to certain embodiments.

With reference to FIG. 18, as in illustrative screen 1801, the electronic device 101 may provide a related screen through the display 220 in a situation requiring fingerprint input, for example, in a fingerprint recognition mode (or, fingerprint mode) operating based on the fingerprint recognition sensor 200. In an embodiment, the display 220 may display an indicating object 300 on a region (e.g., fingerprint recognition region) corresponding to a location of the fingerprint recognition sensor 200.

As in illustrative screen 1803 or 1805, the user may recognize the fingerprint recognition region indicated by the indicating object 300 and enter a finger touch based on the fingerprint recognition region. According to an embodiment, the electronic device 101 may detect a touch in the fingerprint recognition region based on the touch sensor 610.

According to certain embodiments, the electronic device 101 may identify a region in which a touch is detected (e.g., touch region 1840 or 1850) and a touch direction (or, touch input direction) 1860 or 1870, and provide a visual effect 1820 or 1830 by changing a position of the object (e.g., the function, application, execution object, or text object) 1810 based on the touch region 1840 or 1850 and the touch direction 1860 or 1870.

According to an embodiment, the electronic device 101 may determine the direction 1860 or 1870 of contact between the touch region 1840 or 1850 and the user's finger in the fingerprint recognition region. According to an embodiment, as shown by illustrative screen 1803, the electronic device 101 may identify a direction 1860 entering the display 220 from bottom to up. According to an embodiment, as shown by illustrative screen 1805, the electronic device 101 may identify a direction 1870 entering the display 220 diagonally from lower right to upper left.

According to certain embodiments, the electronic device 101 may identify the object 1810 based on the touch region 1840 or 1850 in which a touch is detected (e.g., region hidden from the user's view due to user's finger touch) in the effect region for graphical effects. For example, the electronic device 101 may determine whether there is an object 1810 included in (or, overlapping) the touch region 1840 or 1850. In an embodiment, the electronic device 101 may determine whether there is at least one object 1810 in the touch region 1840 or 1850 based on at least location information of the object in the designated effect region for graphical effects.

According to certain embodiments, the electronic device 101 may provide a visual effect using the object 1810 based on the touch region 1840 or 1850 and the touch direction 1860 or 1870 in the effect region. According to an embodiment, for an object 1810 that overlaps the touch region 1840 or 1850 and the touch direction 1860 or 1870 on the display 220, the electronic device 101 may provide a visual effect by preventing the corresponding object 1810 from overlapping (or, preventing from being hidden from the user's view due to user's finger touch).

In an embodiment, as shown in illustrative screen 1803, the electronic device 101 may provide a visual effect 1820 by displaying the object 1810 that is divided and/or moved so that it does not overlap the touch region 1840 based at least on the touch region 1840 and/or the touch direction 1860. According to an embodiment, as shown in illustrative screen 1805, the electronic device 101 may provide a visual effect 1830 by displaying the object 1810 that is divided, moved, and/or relocated (or aligned) based at least on the touch region 1850 and/or the touch direction 1870 so that the object 1810 does not overlap the touch region 1850.

Figure 19:
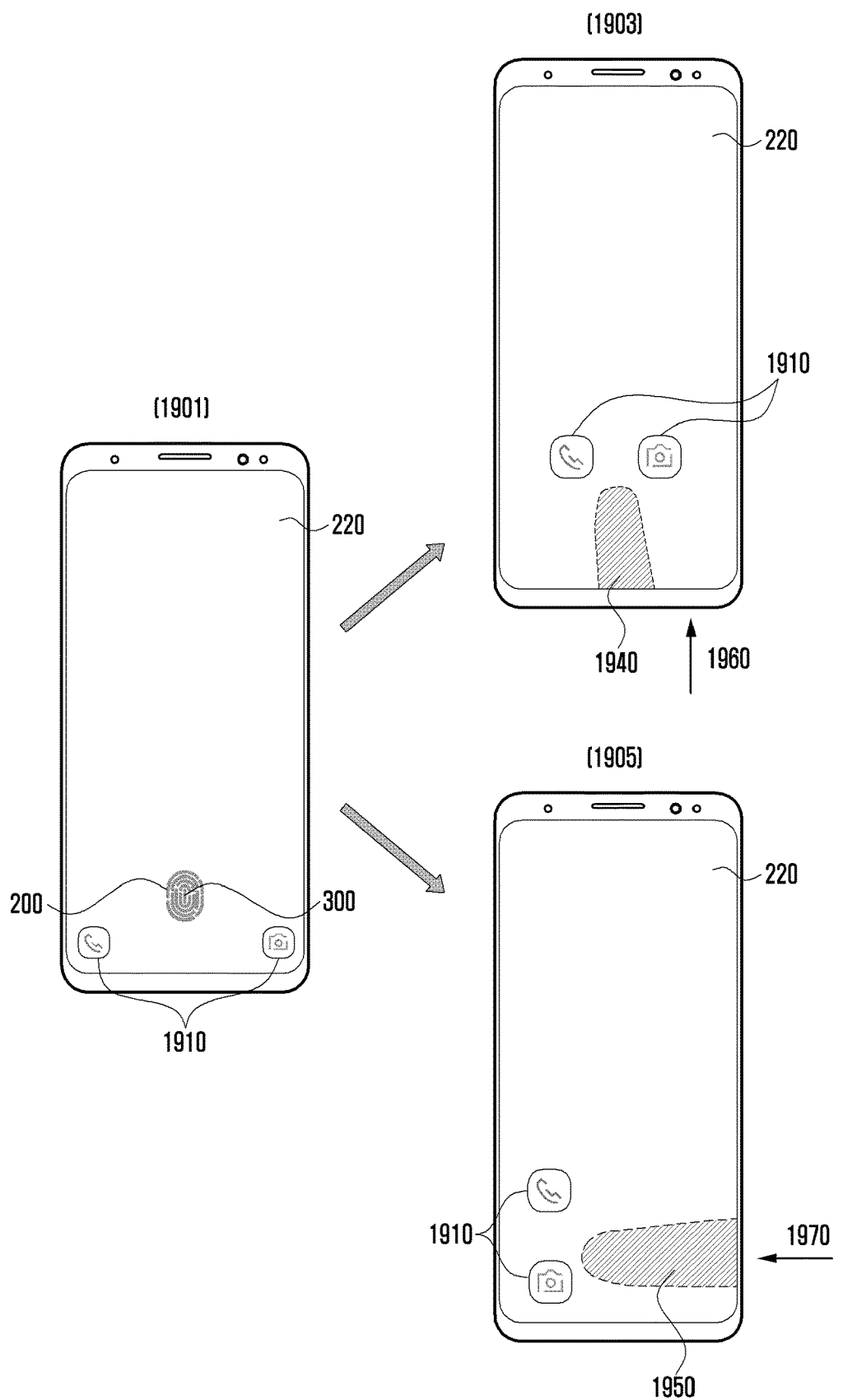
FIG. 19 is a diagram illustrating an example of a user interface providing a graphical effect in the electronic device according to certain embodiments.

FIG. 19 is a diagram illustrating an example of a user interface that provides a graphical effect in the electronic device 101 according to certain embodiments.

With reference to FIG. 19, as in illustrative screen 1901, the electronic device 101 may provide a related screen through the display 220 in a situation requiring fingerprint input, for example, in a fingerprint recognition mode (or, fingerprint mode) operating based on the fingerprint recognition sensor 200. In an embodiment, the display 220 may display an indicating object 300 on a region (e.g., fingerprint recognition region) corresponding to a location of the fingerprint recognition sensor 200.

As in illustrative screen 1903 or 1905, the user may recognize the fingerprint recognition region indicated by the indicating object 300 and enter a finger touch based on the fingerprint recognition region. According to an embodiment, the electronic device 101 may detect a touch in the fingerprint recognition region based on the touch sensor 610.

According to certain embodiments, the electronic device 101 may identify a region in which a touch is detected (e.g., touch region 1940 or 1950) and a touch direction (or, touch input direction) 1960 or 1970, and provide a visual effect by changing an object (e.g., function (or application) execution object, text object) 1910 based on the touch region 1940 or 1950 and the touch direction 1960 or 1970.

According to an embodiment, the electronic device 101 may determine the direction 1960 or 1970 of contact between the touch region 1940 or 1950 and the user's finger in the fingerprint recognition region. According to an embodiment, as shown by illustrative screen 1903, the electronic device 101 may identify a direction 1960 entering the display 220 from bottom to up. According to an embodiment, as shown by illustrative screen 1905, the electronic device 101 may identify a direction 1970 entering the display 220 from right to left.

According to certain embodiments, the electronic device 101 may identify one or more display objects 1910 based on the touch region 1940 or 1950 in which a touch is detected (e.g., a region hidden from the user's view due to user's finger touch) in the effect region for graphical effects. For example, the electronic device 101 may determine whether the objects 1910 are included in (or, overlapping) the touch region 1940 or 1950. In an embodiment, the electronic device 101 may determine whether at least one object 1910 is disposed in at least one of the touch region 1940 or 1950 or the touch direction 1960 or 1970, based at least on location information of the object in the designated effect region for graphical effects.

According to certain embodiments, the electronic device 101 may provide a visual effect moving object 1910 based on the touch region 1940 or 1950 and the touch direction 1960 or 1970 in the effect region. According to an embodiment, when the object 1910 is included in (or, overlaps) the touch region 1940 or 1950 and/or the path of the touch direction 1960 or 1970 on the display 220, the electronic device 101 may provide a visual effect preventing the object 1910 from being obscured via overlapping (or, preventing from being hidden from the user's view due to user's finger touch).

In an embodiment, as shown in illustrative screen 1903, the electronic device 101 may provide a visual effect by moving, relocating or realigning the object 1910 based at least on the touch region 1940 and/or the touch direction 1960. For example, the electronic device 101 may display the object 1910 by moving and relocating it above the touch region 1940 in response to the user's finger entering in a down to up direction 1960. In an embodiment, as shown in illustrative screen 1905, the electronic device 101 may provide a visual effect by displaying the object 1910 that is moved and/or relocated (or aligned) based on the touch region 1950 and the touch direction 1970. For example, the electronic device 101 may display the object 1910 by moving and relocating it to the left of the touch region 1950 in response to the user's finger entering in a right to left direction 1970.

According to certain embodiments, in the example of FIG. 19, the object 1910 may be, for example, an object capable of directly executing a function related to the corresponding object (e.g., phone icon, camera icon) together with unlocking by user authentication through the fingerprint recognition sensor 200. For example, the user may directly execute a function of the object 1910 together with unlocking through fingerprint recognition. According to an embodiment, the user may perform fingerprint recognition by touching the fingerprint recognition region indicated by the indicating object 300, and may select an object 1910 (e.g., phone icon or camera icon) related to a function to be executed by a consecutive input (e.g., swipe or drag input). Accordingly, in certain embodiments, for the convenience of consecutive function execution in parallel with the user's fingerprint recognition, the object 1910 may be moved according to the touch region and touch direction to thereby improve the convenience of consecutive user inputs and the accessibility of the user.

FIG. 20 is a diagram illustrating an example of a user interface that provides a graphical effect in the electronic device 101 according to certain embodiments.

According to an embodiment, FIG. 20 may show an example of operating the electronic device 101 in a landscape case (e.g., horizontal screen). For example, in certain embodiments, the electronic device 101 may provide a display fingerprint recognition function in a portrait case (e.g., vertical screen) or may provide a display fingerprint recognition function in a landscape case. According to an embodiment, even when operating the display fingerprint recognition function in a landscape case, it is possible to provide visual effects according to operating the display fingerprint recognition function in a portrait case as described above.

With reference to FIG. 20, as in illustrative screen 2001, the electronic device 101 operating in a landscape case (e.g., horizontal screen) may provide a related screen through the display 220 in a situation requiring fingerprint input, for example, in a fingerprint recognition mode (or, fingerprint mode) operating based on the fingerprint recognition sensor 200. In an embodiment, the display 220 may display an indicating object 300 on a region (e.g., fingerprint recognition region) corresponding to a location of the fingerprint recognition sensor 200.

As in illustrative screen 2003 or 2005, the user may recognize the fingerprint recognition region indicated by the indicating object 300 and enter a finger touch based on the fingerprint recognition region. According to an embodiment, the electronic device 101 may detect a touch in the fingerprint recognition region based on the touch sensor 610.

According to certain embodiments, the electronic device 101 may identify a touch region 2040 or 2050 in which a touch is detected and a touch direction (or, touch input direction) 2060 or 2070, and provide a visual effect by changing an object (e.g., function (or application) execution object, text object) 2010 based on the touch region 2040 or 2050 and the touch direction 2060 or 2070.

According to an embodiment, the electronic device 101 may determine the touch direction 2060 or 2070 of contact between the touch region 2040 or 2050 and the user's finger in the fingerprint recognition region. According to an embodiment, as shown in illustrative screen 2003, the electronic device 101 may identify a direction 2060 entering the display 220 diagonally from upper right to lower left. According to an embodiment, as shown in illustrative screen 2005, the electronic device 101 may identify a direction 2070 entering the display 220 diagonally from lower left to upper right.

According to certain embodiments, the electronic device 101 may identify an object 2010 based on the touch region 2040 or 2050 in which a touch is detected (e.g., region hidden from the user's view due to user's finger touch) in the effect region for graphical effects. For example, the electronic device 101 may determine whether there is an object 2010 included in (or, overlapping) the touch region 2040 or 2050 and the touch direction 2060 or 2070. In an embodiment, the electronic device 101 may determine whether there is at least one object 2010 in at least one of the touch region 2040 or 2050 or the touch direction 2060 or 2070 based at least on location information of the object in the designated effect region for graphical effects.

According to certain embodiments, the electronic device 101 may provide a visual effect using the object 2010 based on the touch region 2040 or 2050 and the touch direction 2060 or 2070 in the effect region. According to an embodiment, for an object 2010 that is included in (or, overlaps) the touch region 2040 or 2050 and the touch direction 2060 or 2070 on the display 220, the electronic device 101 may provide a visual effect by preventing the corresponding object 2010 from being obscured by overlapping (or, preventing from being hidden from the user's view due to user's finger touch).

In an embodiment, as shown in illustrative screen 2003, the electronic device 101 may provide a visual effect by displaying the object 2010 that is moved and/or relocated based on the touch region 2040 and the touch direction 2060. For example, the electronic device 101 may display the object 2010 by moving and relocating it to the right in response to the user's finger entering in a diagonal direction 2060 from upper right to lower left. In an embodiment, as shown in illustrative screen 2005, the electronic device 101 may provide a visual effect by displaying the object 2010 that is moved and/or relocated based on the touch region 2050 and the touch direction 2070. For example, the electronic device 101 may display the object 2010 by moving and relocating it to the right of the touch region 2050 in response to the user's finger entering in a diagonal direction 2070 from lower left to upper right.

An operation method of an electronic device 101 according to certain embodiments of the disclosure may include: detecting a user input, based on a touch sensor 610, in a fingerprint recognition region including a fingerprint recognition sensor 220 on a display 220; performing fingerprint recognition according to the user input based on the fingerprint recognition sensor 220; and providing a graphical effect related to the user input while performing fingerprint recognition.

According to certain embodiments of the disclosure, detecting a user input may include: detecting an occurrence of an event for entering a fingerprint recognition mode; and displaying an indicating object 300 related to fingerprint input at a position corresponding to a location of the fingerprint recognition region on the display 220 in response to an occurrence of the event.

According to certain embodiments of the disclosure, providing a graphical effect may include excluding a touch region touched by the user input from a designated effect region on the display 220 and providing the graphical effect interacting with the user input based on the remaining non-touch region.

According to certain embodiments of the disclosure, providing a graphical effect may include providing the graphical effect based at least on movement of a designated graphical object and/or an object included in the touch region.

According to certain embodiments of the disclosure, providing a graphical effect may include: identifying a touch region in which the user input is detected while performing fingerprint recognition; excluding the touch region from a designated effect region for the graphical effect; setting the remaining non-touch region excluding the touch region from the effect region as a region for the graphical effect; and displaying the designated graphical object through the non-touch region.

According to certain embodiments of the disclosure, providing a graphical effect may include: identifying a touch direction of the user input; and displaying the designated graphical object in the remaining non-touch region from which the touch region is excluded from the effect region based on the touch direction.

According to certain embodiments of the disclosure, providing a graphical effect may include: identifying a touch region in which the user input is detected and a touch direction of the user input while performing fingerprint recognition; checking whether an object is included in the touch region; and providing, in case that an object is included in the touch region, the graphical effect by changing the object based at least on the touch region or the touch direction.

According to certain embodiments of the disclosure, checking whether an object is included in the touch region may include determining whether the object is included in at least one of the touch region or the touch direction based on location information of the object.

Certain embodiments of the disclosure disclosed in the present specification and drawings are merely specific examples to easily explain the technical details of the disclosure and help the understanding of the disclosure, and are not intended to limit the disclosure. Therefore, the range of the disclosure should be construed as including all changes or modifications derived from the technical range of the disclosure in addition to those embodiments disclosed herein.

The invention claimed is:

1. An electronic device, comprising:
a display;
a touch sensor;
a fingerprint recognition sensor disposed under the display;
a processor; and
memory storing instructions which, when executed by the processor cause the electronic device to:
display an indicating object within a fingerprint recognition region on the display that corresponds to a location of the fingerprint recognition sensor;
detect, using the touch sensor, a user input to the fingerprint recognition region where the indicating object is displayed;
execute fingerprint recognition on the user input using the fingerprint recognition sensor, wherein the fingerprint recognition comprises scanning a user's fingerprint and generating a fingerprint image; and
display a graphical object with an expanding radius centered on a region where the user input is detected in the fingerprint recognition region, while detecting the user input.

2. The electronic device of claim 1, wherein memory stores instructions for causing the electronic device to:
detect occurrence of an event corresponding to execution of a fingerprint recognition mode; and
based on the detected occurrence, display an object prompting input of a fingerprint at a position corresponding to the fingerprint recognition region on the display.

3. The electronic device of claim 1, wherein memory stores instructions for causing the electronic device to:
set a designated effect region on the display, to which the graphical object is displayable, that is less than an entirety of the display; and
detect, within the designated effect region, a touch region on which the user input is detected, and a non-touch region from which the user input is absent,
wherein the graphical object is displayed on at least a portion of the non-touch region of the designated effect region and excluded from display in the touch region of the designated effect region, such that all visual additions are excluded from the touch region during display of the graphical object.

4. The electronic device of claim 3, wherein display of the graphical object is based at least partly on movement of the graphical object displayed within the touch region.

5. The electronic device of claim 4, wherein memory stores instructions for causing the electronic device to:
configure the touch region to exclude displaying the graphical object, and set the non-touch region to include displaying the graphical object,
wherein the graphical object is displayed through the non-touch region.

6. The electronic device of claim 4, wherein memory stores instructions for causing the electronic device to:
identify a touch direction of the user input while performing fingerprint recognition,
wherein the graphical object is displayed within the non-touch region according to the identified touch direction.

7. The electronic device of claim 4, wherein memory stores instructions for causing the electronic device to:
identify a touch direction of the user input while performing fingerprint recognition; and
detect whether an object is included in at least one of the touch region or along a path of the touch direction,
wherein, when the object is included in the touch region, displaying the graphical object by visually changing the object based on the touch direction.

8. The electronic device of claim 1, wherein:
the graphical object is displayed for a prespecified time, corresponding to a recognition and processing time for analyzing a fingerprint through the fingerprint recognition sensor.

9. The electronic device of claim 1,
wherein the graphical object is selected for display randomly from among a set of prestored graphical objects, or predesignated by a user from among the set of prestored graphical objects, and
wherein memory stores instructions for causing the electronic device to:
extract at least one color from background colors of a screen currently displayed on the display, and tinting the selected graphical object using the extracted at least one color.

10. The electronic device of claim 3, wherein the graphical object fills an entirety of a circular region defined initially by a radius originating from a center of the touch region excepting the touch region, while detecting the user input.

11. A method of an electronic device, the method comprising:
displaying an indicating object within a fingerprint recognition region on a display that corresponds to a location of a fingerprint recognition sensor;
detecting a user input, based on a touch sensor, to the fingerprint recognition region where the indicating object is displayed;
executing fingerprint recognition on the user input using at least one processor and the fingerprint recognition sensor, wherein the fingerprint recognition comprises scanning a user's fingerprint and generating a fingerprint image; and
displaying a graphical object with an expanding radius centered on a region where the user input is detected in the fingerprint recognition region, while detecting the user input.

12. The method of claim 11, wherein detecting the user input comprises:
detecting occurrence of an event corresponding to execution of a fingerprint recognition mode; and
based on the detected occurrence, displaying an object prompting input of a fingerprint at a position corresponding to the fingerprint recognition region on the display.

13. The method of claim 11, further comprising:
setting a designated effect region on the display, to which the graphical object is displayable, that is less than an entirety of the display; and
detecting, within the designated effect region, a touch region on which the user input is detected, and a non-touch region from which the user input is absent, wherein the graphical object is displayed on at least a portion of the non-touch region of the designated effect region and excluded from display in the touch region of the designated effect region, such that all visual additions are excluded from the touch region during display of the graphical object.

14. The method of claim 13, wherein displaying the graphical object further includes displaying a graphical object within the non-touch region.

15. The method of claim 14, wherein providing a graphical object includes identifying a touch direction of the user input, and wherein displaying the graphical object in the non-touch region is at least partly based on the touch direction.

16. The method of claim 13, further comprising:

detecting a touch direction of the user input while executing fingerprint recognition; and detecting whether an object is disposed within the touch region or disposed along a path indicated by the touch direction, wherein, when the object is disposed within the touch region or disposed along the path indicated by the touch direction, displaying the graphical object by visually changing the object based on the touch direction.

17. The method of claim 13, wherein the graphical object fills an entirety of a circular region defined initially by a radius originating from a center of the touch region excepting the touch region, while detecting the user input.

18. A non-transitory computer-readable recording medium storing a program which, when executed, causes a processor to perform operations comprising:

displaying an indicating object within a fingerprint recognition region on a display that corresponds to a location of a fingerprint recognition sensor;

detecting a user input, based on a touch sensor, to the fingerprint recognition region where the indicating object is displayed;

executing fingerprint recognition on the user input using at least one processor and the fingerprint recognition sensor, wherein the fingerprint recognition comprises scanning a user's fingerprint and generating a fingerprint image; and displaying a graphical object with an expanding radius centered on a region where the user input is detected in the fingerprint recognition region, while detecting the user input.

19. An electronic device comprising the non-transitory computer-readable recording medium of claim 18.

* * * * *